April 1, 1969

R. E. BELL ET AL 3,435,916

ELEVATOR MOTOR SPEED CONTROL, INCLUDING A HIGH GAIN
FORWARD LOOP AND LAG-LEAD COMPENSATION

Filed June 4, 1964

INVENTORS.
ROBERT E. BELL
DONIVAN L. HALL
RICHARD C. LOSHBOUGH

BY: Marshall, Wilson & Yeasting
ATTORNEYS

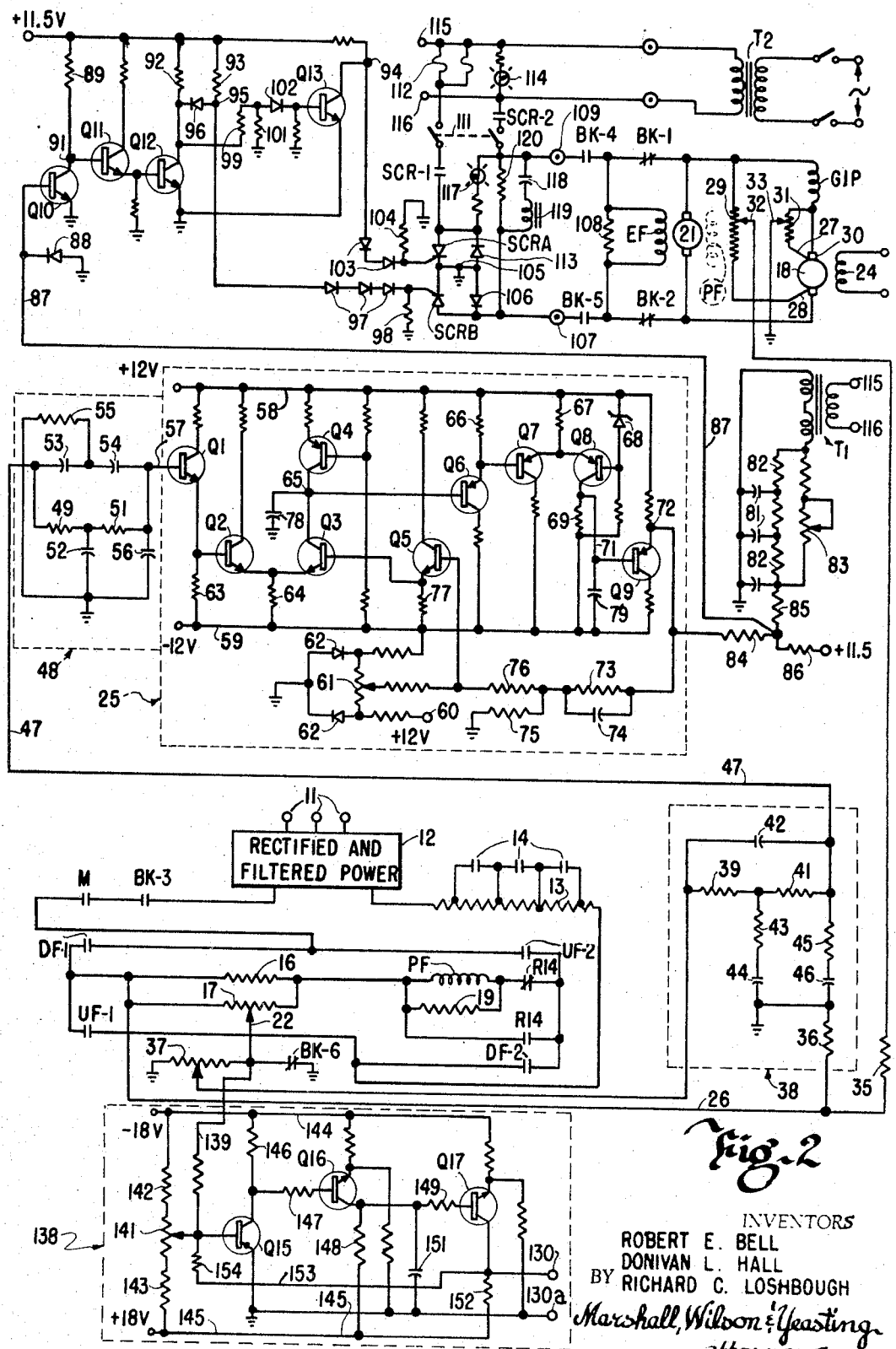

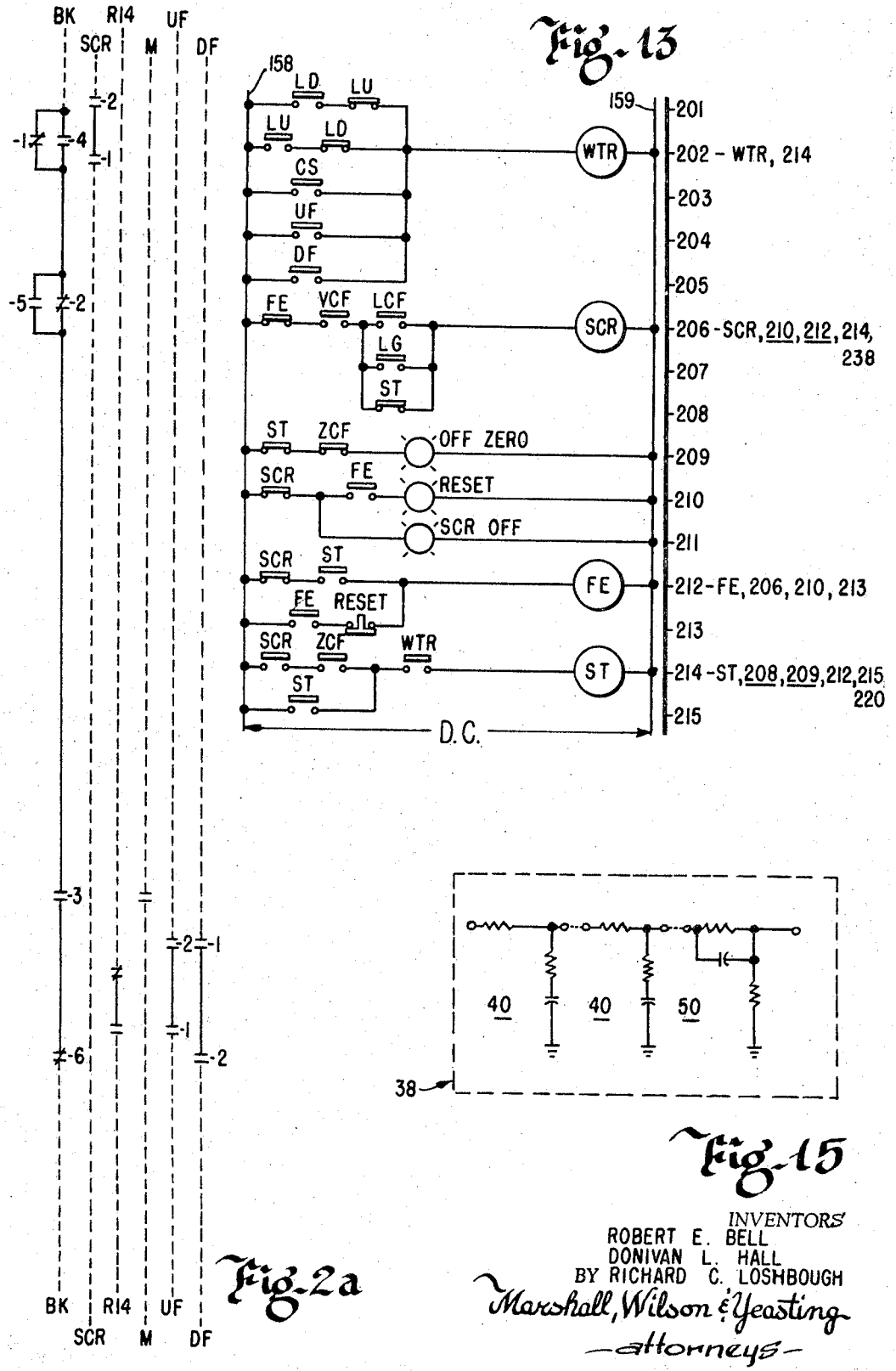

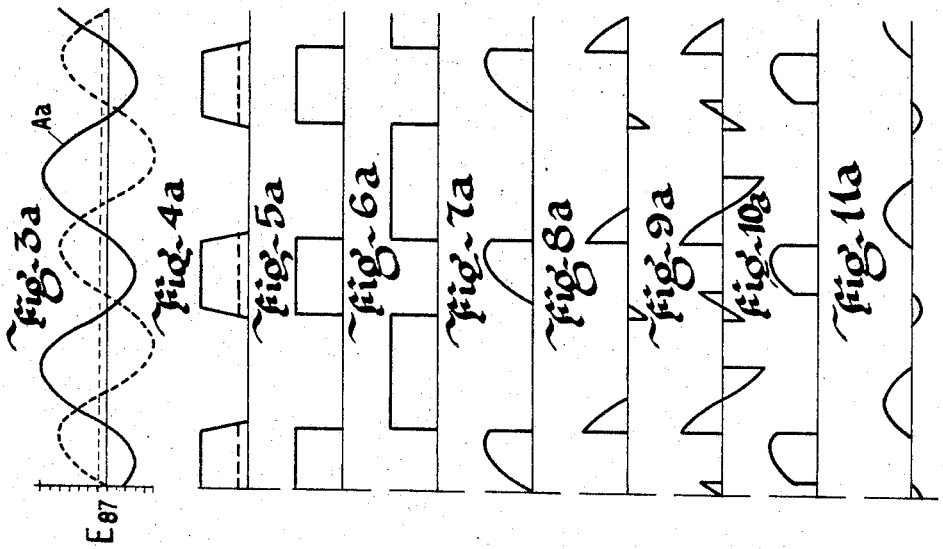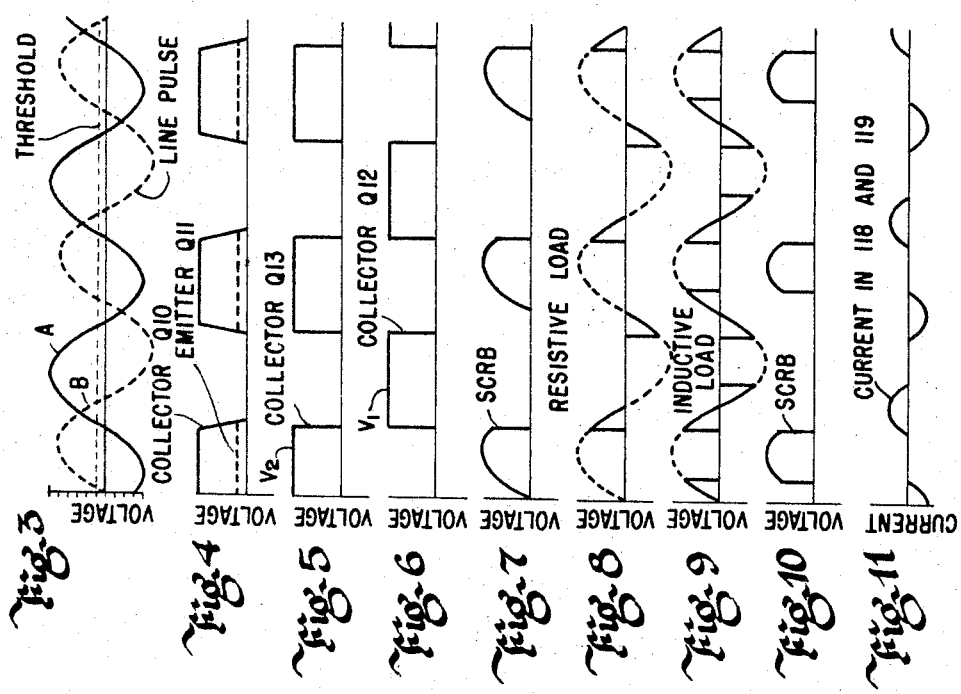

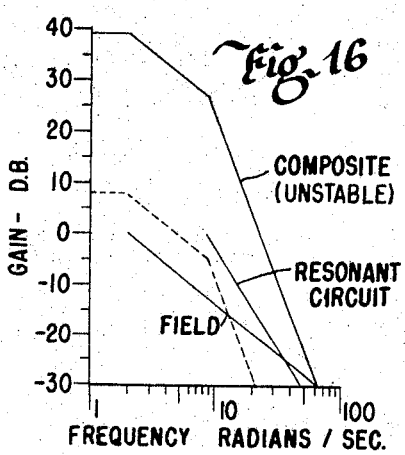
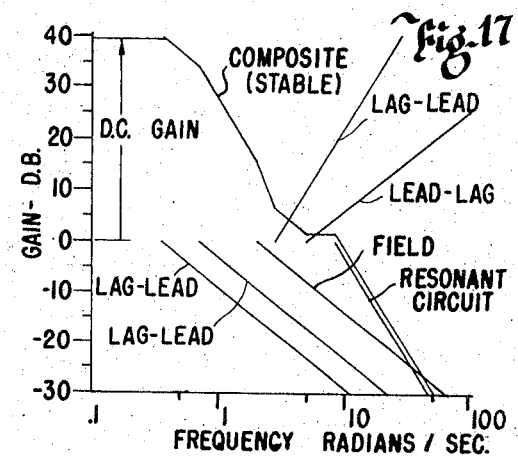
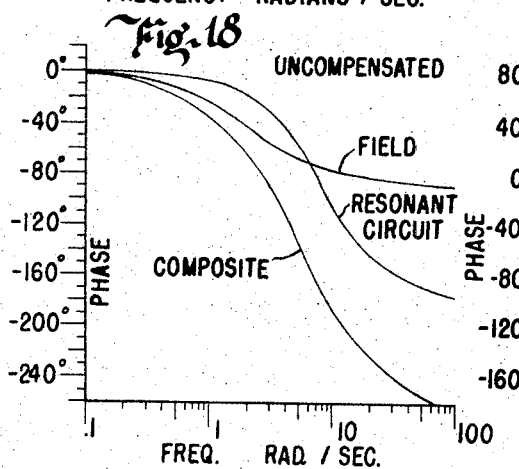
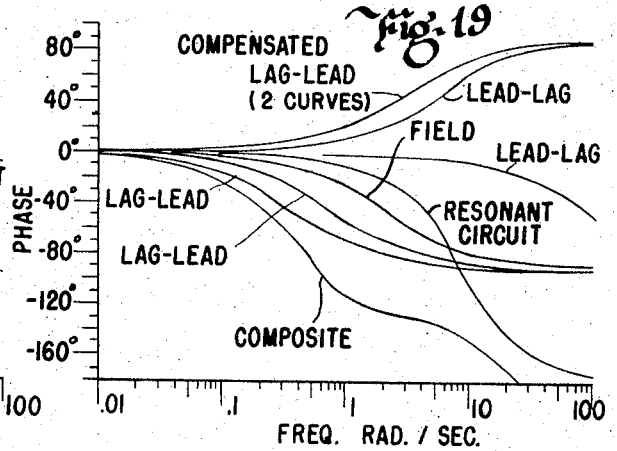
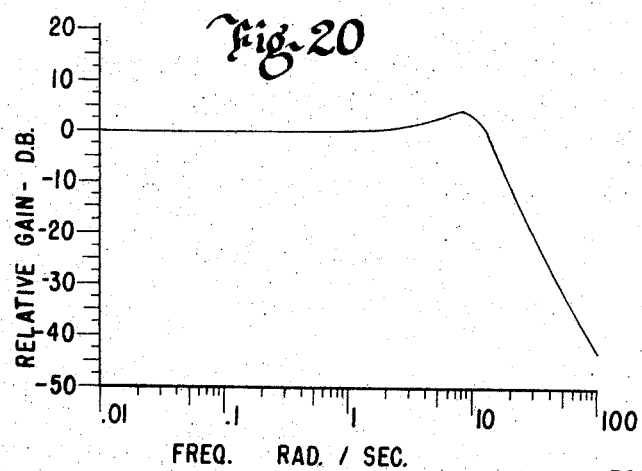

United States Patent Office 3,435,916
Patented Apr. 1, 1969

3,435,916
ELEVATOR MOTOR SPEED CONTROL INCLUDING A HIGH GAIN FORWARD LOOP AND LAG-LEAD COMPENSATION
Robert E. Bell, Donivan L. Hall, and Richard C. Loshbough, Toledo, Ohio, assignors, by mesne assignments, to The Reliance Electric and Engineering Company, Cleveland, Ohio, a corporation of Ohio
Filed June 4, 1964, Ser. No. 373,136
Int. Cl. B66b 1/00
U.S. Cl. 187—29  4 Claims

ABSTRACT OF THE DISCLOSURE

A variable voltage elevator hoist motor speed control having a direct current generator and negative feedback loop including a high gain amplifier operating upon a speed error signal developed from the difference between a commanded hoist motor speed and actual hoist motor speed. The imperfect regulatory characteristics internal to the motor, generator and interconnecting circuits from the effects of unbalanced loads and component imperfections, such as nonlinearities, response to temperature variations and hysteresis, are suppressed to a negligible value by the high gain amplifier and an external independent phase and gain compensation network such that the speed error signal is forced to a negligibly small value and ideally to zero.

---

This invention relates to motor controls and more particularly to controls for the hoist motor of an elevator.

Elevator hoist motors, particularly those employed for relatively high speed operation of the elevator car, e.g., 800 feet per minute and above, are subject to rather critical control requirements due to the large inertial masses which are to be driven under a wide range of loadings, the precision with which the elevator car must be positioned when brought to a landing, and the smooth and comfortable accelerations and rates of change of acceleration which must be satisfied. It is common practice to counterbalance the elevator car and a portion of its load capacity, usually forty percent of rated load. Thus five conditions of loading are encountered on an elevator counterbalanced at forty percent of rated load. When the car is loaded at forty percent of capacity, only the inertia of the load must be overcome. For any other loading a variable, uncontrolled, unbalanced load is superimposed upon this inertia. When it is loaded less than forty percent of rated load, the car when descending must be driven downward or retarded when ascending. When the load is greater, the car when ascending must be driven and when descending must be retarded.

Since floor to floor time is a major criterion of high caliber elevator service maximum comfortable smooth acceleration is sought under all of these conditions. Slowdown and stopping of the car should follow similar maximum decelerations for all loadings. Precise control of the elevator speed throughout its travel is therefore highly desirable in order that accurate initiation of slowdown and stopping of the car level with the landing is obtained at all loadings.

Heretofore the preferred elevator motor control has been a D.C. motor having a variable voltage source for its armature and a shunt field winding that can be energized at a constant level or with some limited range of variation to provide speed control. This type of control has been subjected to much refinement and to the superposition of auxiliary equipment in an effort to achieve the characteristics noted above. These have included numerous compensation means for variations in load, speed signal developing means which are fed back to the motor control, variable braking means dependent upon load or speed, supplemental motors to absorb some of the load torque particularly as the car is brought to a landing, and regulating generators responding to the factors noted including speed, loading and direction of travel.

Frequently such variable voltage controls have been adjusted to incipient instability in an effort to achieve the maximum characteristics wherein adjustment has been critical, requiring the efforts of highly skilled personnel to adjust and frequently readjust the system. Further apparently identical lifting motors and lifting motor controls often required different adjustments and provide different operating characteristics under identical conditions. These systems have been sensitive to temperature variations, brush and commutator condition, brush position and to aging.

It is an object of the present invention to obviate the above difficulties in a motor control system having the operating characteristics sought for high speed elevators.

Another object is to eliminate much of the complexities of the auxiliary equipment alluded to in a motor control system and, subsidiary thereto, to reduce the first cost and maintenance required.

A further object is to enhance the operating characteristics of elevator lifting motors.

A fourth object is to provide a smooth riding, high speed elevator wherein rapid accelerations and decelerations are employed without discomfort to the passengers.

A fifth object in the illustrative embodiment is to eliminate all sensing and control adjuncts but those for the speed of the elevator or its hoist motor and to employ only the sensed speed signal to correct errors in the operation of an elevator.

A sixth object is to apply a high level of gain to a signal representative of a single performance parameter of the elevator or hoist motor while avoiding instability of the system.

A seventh object is to avoid unsafe operating conditions in an elevator and its hoist motor, particularly with regard to high gain elements which upon certain malfunctions might operate the hoist motor at excessive speeds.

An eighth object is to improve the efficiency of a supply of pulsating unidirectional current to a highly inductive load.

In accordance with the above objects one feature of this invention resides in a variable voltage control for a direct current mortor employing a high gain amplifier to which is fed an error signal derived from a speed pattern and a fed back speed signal. In order to avoid instability at the high gain levels, the error signal phase and magnitude is controlled by a filter network arranged to avoid the imposition on the amplifier of signals which would result in instability.

A second feature comprises a pattern signal generator of conventional form such as those previously employed in the elevator art to generate a stepped speed pattern with means to smooth the output signal to produce a signal which approaches the optimum for combination with a motor speed signal. This smoothing means, in one embodiment, comprises an inductance. Advantageously, the inductance can be a portion of the generator shunt field in a Ward Leonard type of variable voltage control.

A third feature resides in altering the bandwidth of response to signals to hoist motor control systems which include a closed loop from the hoist motor to the error signal generator, the compensating network, the amplifier and the controlled source of power back to the motor in accordance with the state of the elevator. When a rapid response to changes in signal to the hoist motor is desired, as where small speed error steps are applied when in the final travel leveling into the landing or to develop the torque required to hold any unbalanced load as the brake is released and the car started, a wide bandwidth is employed. At higher hoist motor speeds where larger speed steps are imposed a narrower bandwidth is utilized to smooth the motor response to those steps and avoid a rough ride in the elevator.

Another features involves a velocity based elevator hoist motor control which utilizes but a single loop feedback system. Such a loop involves only velocity feedback and by virtue of the high gain amplifier swamps out all other factors which caused variations in the operating characteristics such as changes in speed with load, generator nonlinearities, and armature current effects. Thus, such supplemental compensating means as those responsive to the rate of change of armature current or speed, compounding and intermediate braking equipment is eliminated.

Another feature comprises utilizing a compensating network in the regulating loop for the error signal to an elevator hoist motor which so coordinates the attenuation and phase shift of the error signal which is amplified to feed the motor control that high gain is provided in the loop for zero frequency or constant signals and that a sufficient attenuation is imposed at the natural resonant frequency of the combination of the inductance of the hoist motor armature, the impedance of the remainder of the loop supplying the hoist motor, and capacitative effect of the effective reflected load mass on the hoist motor, that the gain of the system will limit the speed error to tolerable limits. A network made up of a pair of lag-lead networks and a lead-lag network or their equivalent provides this desired characteristic.

A sixth feature involves the safety interlocks which are utilized to limit the energization of the motor in the event of an excessive error signal, an excessive releveling signal or an appreciable speed signal prior to the start of the motor. These interlocks are particularly desirable as safety factors in view of the control provided by this system.

A seventh feature involves an auxiliary control available to advance the motor and elevator to the next landing at a reduced speed when an unsafe operating condition or an excessive signal is sensed. In one embodiment utilizing a Ward Leonard type of system the amplifier and its associated error signal circuitry is supplanted by a direct pattern control of the current in the generator shunt field.

A further feature resides in a controlled rectifier supply to the generator shunt field of a Ward Leonard system wherein capacitance is connected across the highly inductive field to avoid the inductive limiting effects on the rectifier supply. Excessive power dissipation as might be experienced with a damping resistance is avoided by the capacitance. The surge currents in the circuit are limited by including an inductance in series with the capacitance across the inductive load.

The above and additional objects and features of this invention will be appreciated more fully from the following detailed description when read with reference to the accompanying drawings in which:

FIG. 2 is a schematic diagram of the system of FIG. 1 showing a velocity signal control of an elevator hoist motor;

FIG. 2a is a spindle diagram arranged to be aligned with FIG. 2 to locate the relay contacts shown in FIG. 2;

FIGS. 3 through 11 are waveforms of the signals appearing at various points in the firing circuit and output of the phase controlled, controlled, rectifier source supplying the shunt field of the generator supplying the hoist motor in FIG. 2, the signals representing those present when a zero input signal is applied to the circuit;

FIGS. 3a through 11a are waveforms of the signals appearing at the same points as for FIGS. 3 through 11 respective when a positive signal is applied to the input of the circuit;

FIGS. 13 and 14 are across the line diagrams of certain of the elevator system controls which enter into the control of the hoist motor operation, particularly with respect to stopping the elevator, leveling it at landings and enabling it to apply its unbalanced load to the hoist motor, together with certain safety and bandwidth control functions;

FIG. 15 is a compensating network which is equivalent to that illustrated in FIG. 2;

FIGS. 16 through 19 are semilogarithmic plots of the attenuation and phase shift of the signal response of an open loop elevator hoist motor control system, FIGS. 16 and 18 illustrating the uncompensated system and FIGS. 17 and 19 representing the compensated system; and FIG. 20 is a semilogarithmic plot of the attenuation of signal response with frequency for a closed loop, compensated elevator hoist motor control system.

Figure 14:
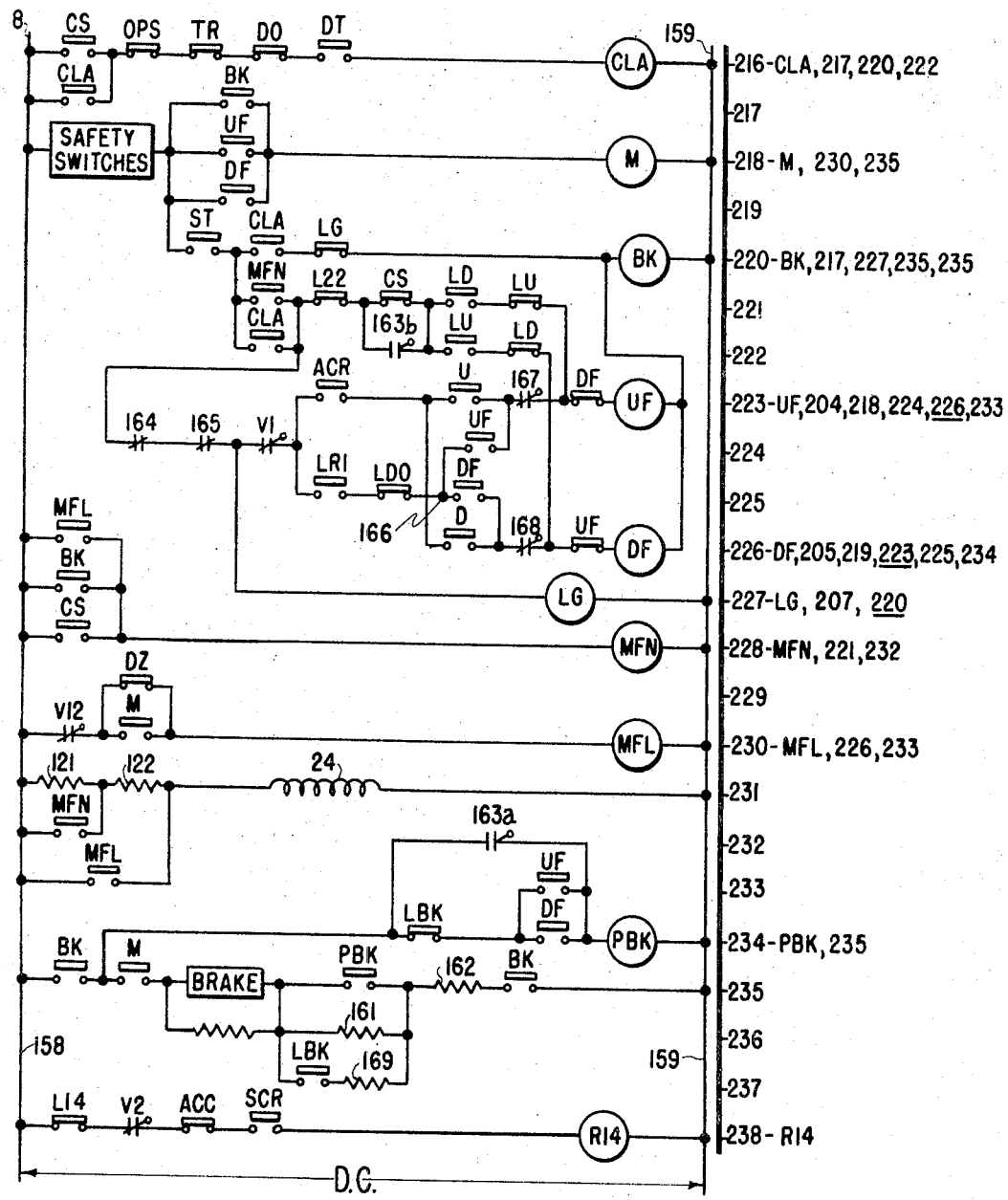

Before proceeding with a detailed description of one embodiment of the invention, certain aspects of the drawings will be discussed. A number of relay contacts are shown in FIGS. 2, 13 and 14. These contacts are all depicted in the condition they assume with their actuating coils deenergized and their armatures released. Two forms of diagram have been employed. In the schematic of FIG. 2 the contacts of six relays, actuating coils and energizing circuits for which are shown in FIGS. 13 and 14, are employed. The spindle diagram of FIG. 2a is provided to facilitate the location of these contacts. When FIGS. 2a and 2 are placed side by side in alignment the contacts on FIG. 2 are horizontally aligned with their vertical position along the spindles of FIG. 2a.

The across the line diagrams of FIGS. 13 and 14 are arranged with the contacts physically separated from their operating coils. In order to provide a correlating means these diagrams are provided with a marginal index on the right side. Line or zone numbers are assigned to horizontal bands extending across the diagrams and are set forth in the index in the first column to the right of the diagrams. Each zone containing an operating coil has that coil listed in the index next to the zone number and all contacts depicted in the diagrams are listed by their zone number next to the reference character for the coil. Those contacts which are normally closed and are opened when the coil is energized or the armature pulled in, back contacts, have their zone numbers underlined to distinguish them from front contacts which are also listed by their zone numbers. Certain of the contacts on FIG. 14 are mechanically operated as by the position of a cam shaft employed in generating the pattern command for the hoist motor or by the position of the doors. The cam shaft contacts are provided with the prefix V, the door contacts are numbered.

In order to further facilitate an understanding of the circuits a list of the relay symbols set forth in alphabetical order with their functional designations and, where shown, the zone location of their actuating coils follows:

ACC—Acceleration ___
ACR—Acceleration ___
BK—Brake ___ 220
CLA—Door Close ___ 216
CS—Car Starting ___
D—Down Direction Determining ___
DF—Down Generator Field ___ 226
DO—Door Open Control ___
DT—Door Control ___
DZ—Dead Zone ___
FE—Failure ___ 212
LBK—Leveling Brake ___
LCF—Leveling Check Failure ___

Figure 1:
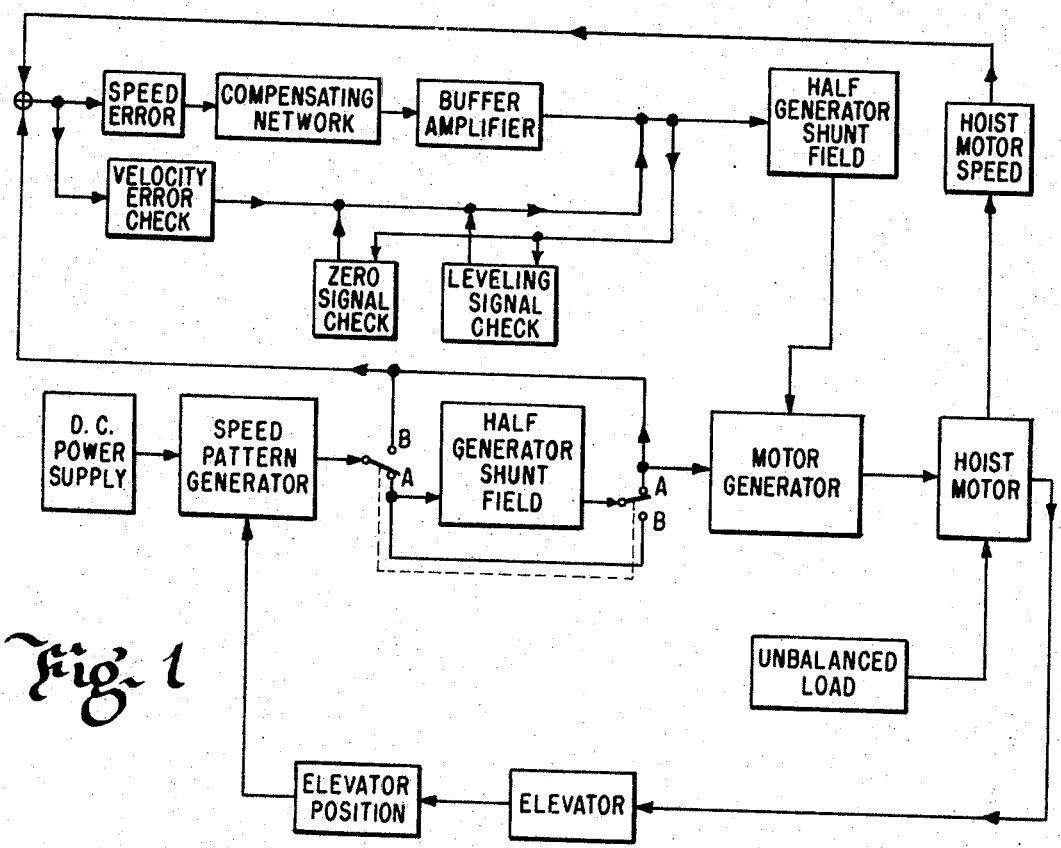
FIG. 1 is a fuinctional block diagram of the system illustrating many of the salient features of the invention.

LD—Down Leveling
LDO—Leveling Door Open
LG—Landing and Gate ............................ 227
LR1—Emergency
LU—Up Leveling
L14—14″ Leveling
L22—22″ Leveling
M—Main Switch ................................. 218
MFL—Motor Full Field ........................... 230
MFN—Motor Normal Field ........................ 228
OPS—Door Opening Control
PBK—Partial Brake .............................. 234
R14—Retard Stop Approach ....................... 238
SCR—Silicon Controlled Rectifier Power ........... 206
ST—Start ...................................... 214
TR—Minimum Start Time
U—Up Direction Determining
UF—Up Generator Field .......................... 223
VCF—Velocity Error Check Failure
WTR—Want to Run ............................. 202
ZCF—Zero Check Failure A block diagram of the system of this invention is shown in FIG. 1. In the illustrative embodiment a speed pattern or speed command generator which comprised a group of resistors selectively connected and disconnected in a combination of series and parallel circuits is supplied from a direct current power source. The resistor interconnections can be controlled by a group of inductor switches mounted on the elevator car so as to be actuated as the car moves along the hatchway and they are carried into proximity with ferromagnetic vanes secured in the hatchway at critical positions spaced from the landings. Other resistor connections are made by means of cam actuated switches which are driven through suitable motion reduction devices in accordance with the car position with respect to its starting or stopping position. Such a system is set forth in detail in United States patent application Ser. No. 343,301, filed Feb. 7, 1964 for Elevator Control in the names of Robert O. Bradley and Paul F. DeLamater.

During the running of the elevator from a landing and until it enters the final portion of its stopping region, the speed pattern is fed to a first section of the shunt field of the generator supplying the variable voltage to the armature of the hoist motor. In addition to supplying a portion of the generator field flux the first section tends to smooth the step-like pattern developed from the closure of switches in the pattern generator.

The smoothed pattern signal is combined with a hoist motor speed signal to produce a speed error signal as that representing the difference between the pattern speed commanded and the current elevator or hoist motor speed. This error signal is then fed through a compensating network which adjusts both the phase and magnitude of the signal to permit an increase in both the gain and the bandwidth of the system within which it will operate without instability.

A high gain buffer amplifier, one having a gain of from 50 to 100:1, applies the amplified and compensated speed error signal to a second portion of the generator shunt field to determine the voltage level applied by the generator to the armature of the hoist motor. It should be noted that with this arrangement, a car can be driven by the first portion of the generator shunt field once it has attained full speed and the speed signal will supply a correcting flux to overcome only such losses as those due to unbalanced load, generator saturation, and windage. Further, excessive speed error signals indicative of a malfunction can be readily sensed and made to actuate controls which control the speed of the hoist motor and car only through the first portion of the generator shunt field and the speed pattern generator, effectively eliminating the amplified error signal from control until corrective action or inspection and reset of the system has been completed.

Returning to the first portion of the generator shunt field, during the final approach of the elevator to the landing at which it is to stop, this portion of the field is rendered ineffective and the pattern and speed signals are compared to effect control of the car entirely through the second portion of the field. Under these conditions the system exhibits broad bandwidth characteristics which are advantageous for picking up the load, stopping accurately, and releveling, if required.

In the illustrative example the amplified and compensated velocity error signal controls the phase of a firing circuit for a pair of controlled rectifiers connected with like polarity electrodes each connected to one of the two terminals of a single phase alternating current source. These rectifiers are triggered, for zero signal input to their firing circuit, by an alternating current shifted 135° from the line phase so that they are each conductive a like period and the net D.C. derived therefrom is zero. Changes in this supply to the load are achieved by raising or lowering the base of the firing signal to increase the conduction interval in one rectifier over that in the other for a first polarity of pulsating unidirectional current and to reverse that relationship for the opposite polarity when the base of the signal is shifted to the other side of the zero signal level.

The rectifiers are illustrated as supplying a portion of the shunt field of a direct current generator having an armature connected to the armature of the hoist motor. The high gain amplifier and compensator can effectively be applied to control the hoist motor by other techniques in accordance with this invention. For example controlled rectifiers can be employed to supply the hoist motor armature directly, advantageously in a polyphase arrangement. Accordingly, this invention contemplates an amplifier which can be considered a composite of a buffer amplifier, a controlled rectifier or magnetic amplifier power stage and control circuits for the power stage applied directly to the hoist motor or the amplifier can be considered to include the controlled rectifier and the direct current generator in the present example.

Since the primary concepts of elevator hoist motor control involved in the present system include the utilization of a high gain amplifier with suitable compensation to avoid instability and responsive to a principal operating parameter to swamp out the effect of the numerous variables inherent in hoist motor controls, it is to be appreciated that these concepts can be applied to other than a velocity based system. While the exemplary embodiment utilizes a hoist motor speed signal as derived from the counter E.M.F. of the motor corrected for armature current and brush drop effects or from a tachometer, it is to be appreciated that other operating parameters of the system might be employed as the basis of control. Monitoring the motor armature current to measure the required torque can be related to acceleration in a manner to provide effective control. Where signal proportional to an operating parameter other than speed is employed, a suitable modification of the command signal to produce the desired operating parameter is made so that the command signal and the operating parameter signal can be compared to produce a suitable error signal. However, the compensation and amplification of this error signal will involve the same considerations presented here.

In any such system where amplification of the signal to the hoist motor can result in excessive speeds acceleration or rate of change of acceleration the check and interlock functions of the present example are advantageously incorporated. Thus the velocity error check is made at the summing point of the command signal and hoist motor speed signal. This check occurs prior to amplification of the signal but effectively checks the amplifier since any tendency of the amplifier to run away will result in an excessive error signal at the summing point. The check of the zero signal when the elevator is stopped and the leveling signal check when it is leveling is made on the amplified signal. Thus in the example this check is made at the input to the hoist motor shunt field. If any of these checks indicate an excessive signal the alternating supply is disconnected from the controlled rectifiers thereby disabling the supply to the shunt field or, in the case of a zero check, starting is prevented.

The schematic diagram of FIG. 2 shows the principal elements of the system as represented in the block diagram of FIG. 1. A three phase supply 11 feeds a suitable rectifying circuit including filters to provide a smooth output from the block 12. This output is fed to a speed pattern generator of the type discussed above or an equivalent thereof, represented by a rheostat 13 having sequentially operated contacts 14, and through brake relay and main switch contacts BK–3 and M to a reversing circuit.

The reversing circuit applies the pattern signal to a portion of the generator shunt field PF hereinafter termed the pattern field. This circuit is controlled by conventional generator field relays of the elevator circuit as by up generator field relay UF or by down generator field relay DF to reverse the polarity. The inductance of the pattern field tends to smooth the current through resistance 15 and parallel potentiometer 17 in which the difference between the smoother pattern voltage and a speed voltage derived from the hoist motor 18 is developed as a speed error signal. This summing point thus constitutes means for comparing the speed or other performance parameter signal with the pattern or command signal to produce an error signal. Since the speed pattern lags the command from rheostat 14, when the elevator car approaches the landing at which it is to stop, this lag becomes detrimental and precise positional control is sought. Accordingly, it is advantageous to eliminate the pattern field at this time. This is done by opening the back contact R14 in a series with the pattern field and by closing contact R14 around the field whereby the pattern is fed directly to the resistances 16 and 17. At this time the circulating current in the field is dissipated through resistance 19 which can be of the order of 500 ohms whereby the pattern field will decay in about 0.2 second. In the event the rapid decay produces an undesired response in the generator 21 supplying hoist motor 18, the pattern can be adjusted to overcome this effect at the time it occurs.

Hoist motor 18 is provided with a shunt field 24 energized from a suitable source of direct current, as shown at 231 of FIG. 14, which may include some control of the current therein as a speed control supplementing the primary control afforded by the voltage impressed across the motor armature. Generator 21 provides a controlled motor armature voltage. Its armature is driven at a constant speed by a suitable prime mover (not shown) and its output voltage is controlled by control of the current in its shunt field made up of pattern field PF and error field EF. Error field EF is supplied with current from rectifiers controlled by the amplifier 25 and in turn the error signal from potentiometer tap 22.

The speed signal is fed to potentiometer 17 on lead 26. It is derived from a bridge arrangement as disclosed in Robert O. Bradley United States patent application Ser. No. 368,623, which was filed May 19, 1964 and is entitled Motor Speed Control. This arrangement provides a voltage proportional to the E.M.F. generated in the motor, and thus the motor speed, while eliminating the effects of brush drop and armature current on that voltage. It involves providing pilot brushes 27 and 28 on motor armature 18. A potentiometer 29 is connected across the generator interpole winding GIP, one main brush 30 of the motor and the motor armature 18 to pilot brush 28. A second potentiometer 31 is connected from pilot brush 27 across main brush 30. With the taps 32 and 33 of potentiometers 29 and 31 set so that the resistance of their upper portions is related to the resistance of their lower portions in the same proportion as the external resistance provided by the generator interpole windings GIP is related to the motor armature resistance, the voltage developed between taps 32 and 33 is proportional to the speed voltage of the motor. In the example tap 33 is grounded and tap 32 is connected through lead 34 to the voltage divider provided by series resistance 35 and resistance 36 connected to ground so that a signal also proportional to the speed voltage of the motor is fed on lead 26 to potentiometer 17.

The error signal taken as a voltage at tap 22 of potentiometer 17 is applied through loop gain adjustment potentiometer 37 to the compensating filter 38. This filter adjusts the magnitude of the signal applied to the input of amplifier 25 as it results from an error signal in accordance with the rate of change of that error signal whereby the effective signal is attenuated when its effective frequency is in the range where the system is unstable. This filter passes constant signals effectively without attenuation through the serially connected resistances 39 and 41 since its insertion loss is made up in the amplification around the loop. It also passes very high frequencies without significant attenuation through the bridging capacitance 42. At intermediate frequencies, attenuation is caused by the passing of a portion of the signal to ground as through resistance 43 and capacitance 44 and in the following section through resistance 45 and capacitance 46. The effect of this compensating network will be discussed in more detail below. However, it can be characterized as attenuating the closed loop gain as a function of increasing frequency sufficient to reduce that closed loop gain to a value less than unity at and above the natural resonant frequency of the resonant circuit comprising the total inductance and resistance in the hoist motor armature circuit and the capacitative effect of the total driven mass coupled into the armature circuit through the hoist motor.

From compensating network 38 the error signal is passed over lead 47 to notch filter 48 which is tuned to reject sixty cycle per second signals which might be picked up through spurious coupling to the line supplying the system. This filter is made up of a parallel-T network including resistances 49 and 51 with capacitance 52 to ground and capacitances 53 and 54 with resistance 55 to ground. Capacitance 56 connects the output of the network to ground.

The output of the filter 48 is connected by lead 57 to the input of direct current amplifier 25 at the base of transistor Q1. This amplifier is stabilized by negative feedback to provide the desired amplifier gain. It comprises a plurality of transistor amplifier sections biased from a base 58 held at positive twelve volts and a base 59 held at negative twelve volts. Terminal 60 is also connected to a positive twelve volt supply to produce a voltage divider for zero adjustment potentiometer 61. This potentiometer is accurately regulated by forward biased diodes 62 to ground so that it can be adjusted for zero voltage at the emitter of transistor Q9 with zero input on lead 57.

Operation of the amplifier 25 to control the firing point of the controlled rectifiers supplying field EF will best be appreciated from a consideration of its operation. Application of a positive input on lead 57 will raise the emitter voltage of Q1 through the increase in the current flowing in resistance 63. The resultant increase in base voltage of transistor Q2 causes an increase in current in resistance 64 to raise the emitter of Q2 and Q3.

The base of Q3 is held at a constant voltage so that the increase of Q3 emitter voltage reduces the collector current and causes a rise in the potential at junction 65. Transistor Q4 is constant current source in the collector circuit of transistor Q3 and causes this stage to have extremely high gain.

In order to insure stability transistors Q1 and Q5 are mounted to maintain uniform temperatures. Q5 offsets any base to emitter voltage of Q1 by establishing the base voltage of Q3.

When the voltage at junction 65 and the base of transistor Q1 rises, the emitter of Q6 increases its voltage by decreased current flow in resistance 66. This increases the base voltage on transistor Q7 causing the emitter of Q7 to increase its voltage with the reduced drop in resistance 67. The emitter voltage of transistor Q8 is increased thereby causing an increase of Q8 collector current since the base of Q8 is held at a constant level by Zener diode 68. The increased collector current through collector resistor 69 raises the voltage on lead 71 to the base of transistor Q9 forcing the emitter of Q9 to raise the voltage at junction 72.

Amplifier stability is insured by feeding a portion of the Q9 emitter voltage back to the base of Q5 through resistor 73. Resistor 73 is shunted by a condenser 74 which imparts stability to the feedback loop by introducing some lead into that loop. The magnitude of resistor 73 determines the amount of negative feedback in accordance with well known principles and if desired can be adjustable. The amount of signal fed back is also determined by grounded resistor 75. This arrangement is such that the increase in Q9 emitter voltage in response to an increase in input or Q1 base voltage (e.g., by a factor of 500) causes the Q5 base voltage to be increased by the same amount as the input. Such an increase at Q5 base voltage results in a current change in resistor 77 increasing Q5 emitter by the same voltage and thus Q3 base by that voltage. It will be recalled that Q3 emitter voltage increased by the amount of input voltage change. Therefore the base to emitter voltage of Q3 is the same at this new signal level as when zero input was present. The system is thus stabilized since a tendency of Q9 emitter voltage to drop causes a corresponding rise in Q3 collector voltage which forces the Q9 emitter voltage to rise.

Condenser 78 passes high frequency components of the signal at Q4 collector to ground to stabilize the amplifier and condenser 79 from the base of Q9 is also included for stabilization.

The firing circuit of the controlled rectifiers is based upon a displacement of the firing wave from the applied line wave so that a pair of back to back rectifiers are fired symmetrically to produce no net current at zero signal and are fired asymmetrically to apply either a positive or negative net current on the generator shunt field EF depending upon the direction of the shift in firing angle.

Transformers $T_1$ and $T_2$ are each driven from the same line voltage so that their inputs are in phase. The output of transformer $T_1$ is phase shifted 135° by the three, cascaded, phase shifting networks each comprising a condenser 81 and a resistor 82. Exact adjustment of this shift is obtained by means of potentiometer 83. This voltage is summed with the output of the amplifier 25 in the summing network of resistors 84 and 85. Resistor 86 connected from a highly regulated positive source of direct current (not shown) to lead 87 and the base of transistor Q10 offsets any threshold voltage of Q10.

In considering the firing circuit two sets of waveforms will be considered. The first set represents the signals at various points in the circuit when zero input is applied at lead 57. The second represents the signals at corresponding points when a positive input or error signal exists. The second set will be distinguished by a lower case $a$.

The waveform across the resistor 85, which is applied on lead 87 in a form modified by the clamping action of diode 88 and the base-emitter diode of transistor Q10 to the base of Q10 with no output from amplifier 25, is shown as a sine wave A shifted 135° from line sine wave B and having its origin shifted as shown in FIG. 3. The waveform at the collector of Q10 is shown in FIG. 4. Excessive reverse bias on Q10 from the A.C. signal on 87 is avoided by the diode 88 which passes negative signals above its threshold to ground. When the applied voltage reaches the threshold voltage of Q10, the transistor begins conducting current and the drop in resistor 89 causes the collector voltage to drop at junction 91. The collector wave form corresponds to the input until the transistor becomes saturated and the curve flats.

Transistor Q11 is an emitter-follower whose emitter voltage would correspond to the signal at junction 91 but for the clamping action of the base-emitter diode of transistor Q12. The dashed line in FIG. 4 is the emitter wave form of Q11.

The collector wave of Q12 is shown in FIG. 6 and the wave form of Q13 is shown in FIG. 5. Transistors Q12 and Q13 and their associated circuitry constitute a Schmitt trigger wherein the triggering signal is developed at junction 91. When zero signal is present at 91, transistor Q13 is conductive and transistor Q12 is held off.

As the base of Q12 goes positive with the emitter of Q11, collector Q12 draws current through resistors 92 and 93 reducing the voltage on base Q13 below its sustaining level and terminating conduction in Q13 whereby its collector voltage rises at junction 94. The increased voltage on the control electrode of silicon controlled rectifier SCRA causes that rectifier to conduct when its applied anode-cathode voltage from transformer $T_2$ is in the forward direction. At this time the voltage at junction 95 is the forward drop of diode 96 above ground and, in view of the forward drop of diodes 97, the voltage on the control electrode of SCRB is brought to ground through resistor 98 to enable its conduction to be terminated.

When the base of Q12 returns to ground, it is cut off and the voltage at the collector of Q12 rises. This voltage is applied through the voltage divider of resistors 99 and 101, and diode 102 to the base of Q13 so that it initiates conduction. The voltage at junction 94 falls below the threshold of diodes 103 so that the control electrode of SCRA is grounded through resistor 104. At this time the potential at junction 95 has risen so that when it exceeds the threshold of diodes 97 the control electrode of SCRB is driven positive beyond its threshold of conduction to enable SCRB to fire.

The collector signals of Q13 and Q12 as shown in FIGS. 5 and 6 are at levels $V_2$ and $V_1$ determined by the conduction drop of the gates of SCRA and SCRB and the threshold voltages of the diodes 103 and 97 in the collector circuits. The voltage in series with the SCR's and load is in phase with the line supplying the primary of $T_2$. If the load were resistive, the voltage across SCRB is shown in FIG. 7 while that across SCRA would be similar for the other half cycle. The resulting wave form across a resistive load would appear as in FIG. 8.

The circuit for SCRA would extend from grounded junction 105 through rectifier 106, junction 107, brake relay contact BK-5, resistor 108, contact BK-4, junction 109, closed "power" switch 111, contact SCR-2, the secondary of transformer $T_2$, fuses 112, switch 111, contact SCR-1, SCRA and junction 105. The corresponding circuit for SCRB is traced through rectifier 113. It should be noted that pilot lamp 114 is connected across the secondary of transformer $T_2$ to indicate power is applied to the firing circuit at terminals 115 and 116 connected to $T_1$ and to the SCR circuit. When the generator field power is on, pilot lamp 117 is illuminated.

The true load on the SCR's is the highly inductive generator field EF and the resistor 108 is significant only when the generator suicide connections are made to permit the decay of the field. This inductive load imposes limits upon pulsating current so that virtually no D.C. flux could be developed in the field winding alone. However, circulating currents are permitted without any direct current loss by shunting field winding EF with a large capacitance 118, e.g., 1500 mf. This arrangement is further enhanced in its operating characteristics, particularly with respect to the surge currents through SCRA and SCRB, by including a relatively low inductance 119 in series with the capacitance as a limiting means, e.g., 0.01 henry and 0.16 ohm. This $L-C$ series circuit has substantial advantage over a shunting resistor of low value in that no D.C. loss is incurred and the efficiency of the circuit is enhanced. Resistor 120 is of a relatively high value, e.g., 1000 ohms, and therefore passes negligible current to the applied signal. Its function is to provide a discharge path for the $L-C$ circuit when the power is disconnected.

As a result of the highly inductive load presented by field EF to the SCR's the current reaches its peak when the input voltage is zero. The SCR's do not turn off until the current goes to zero even if the impressed voltage has reversed sign. Therefore the voltage across the inductive load of field EF is shown in FIG. 9. The voltage across SCRB for this load is shown in FIG. 10. A corresponding voltage is developed across SCRA for the other half cycle under this load.

The filter composed of capacitance 118 and inductance 119 employed to overcome the high impedance presented to pulsating voltages by field EF and to smooth the SCR outputs has a current form as shown in FIG. 11.

Since the areas under the curves of FIG. 11 representing flow in each direction for SCRA and SCRB and in the filter are equal the net or D.C. value is zero and the generator shunt error field EF receives zero input where the signal from amplifier 25 is zero.

A positive or negative signal from amplifier 25, indicating a velocity error signal, as it appears at junction 72 will alter the firing circuit and produce a net D.C. input to the shunt error field by shifting the phase of the firing signal. A positive signal indicative of a hoist motor speed less than the speed commanded when the commanded speed is plus, increases the conduction interval of SCRB while decreasing the conduction interval of SCRA. This change tends to change the generator voltage in a manner to increase the motor speed and decrease the error. Conversely, a negative signal at junction 72 for the same command signal will decrease the conduction interval of SCRB while increasing that of SCRA. This will tend to retard the motor speed by reducing the current in the field EF to reduce or reverse the impressed voltage on the armature thereby decreasing the motor speed to tend to decrease the error.

If a positive voltage is present at junction 72 the waveforms are as shown in FIGS. 3a through 11a. The firing circuit voltage waveform Aa is shifted positively as shown in FIG. 3a with the result that it achieves the threshold of Q10 earlier and sustains that threshold later to lengthen the interval of conduction for SCRB as shown in FIG. 6a and shorten the interval for SCRA as shown in FIG. 5a. The resulting change in the voltage applied to the field EF is shown in FIG. 9a. It will be noted that the flow in SCRB is substantially greater than in SCRA and a net current results causing a generator armature voltage which drives the motor 18. When the motor approaches the desired speed, so that the speed voltage on lead 26 balances the pattern voltage on potentiometer 17, the error signal approaches zero, the voltage at output junction 72 of amplifier 25 is zero and the net D.C. into the fields is zero. Any change in motor speed results in a speed error signal which forces the motor back to its proper speed.

In view of the consequences of a malfunction in this system for an elevator hoist motor particularly in the event the amplifier issues a large signal within the limits of the capacity of the element supplying power so that the power applied to the motor tends to cause excessive speed change, the present system has been provided with means for monitoring the signals and barring operation of the amplifier system when those signals exceed levels which are reasonable for the prevailing conditions. The monitoring is accomplished by completing enabling circuits for the amplifier system so that any failure of a monitoring element causes a "fail safe" operation and the amplifier system will not operate.

The armature of the generator is connected to the shunt field in the usual "suicide circuit" when the elevator car is stopped and the brake set as shown in FIG. 2. In this circuit a brake relay which is deenergized upon the setting of the brake closes its back contacts BK-1 and BK-2 to connect the generator armature to field EF, opens its contact BK-3 to field PF and opens both leads from SCRA and SCRB to EF at contacts BK-4 and BK-5. The suicide circuit causes armature current to flow in a manner to produce a flux opposing any buildup in the generator.

The circuits of FIGS. 13 and 14 are shown across leads 158 and 159 which are supplied from a suitable source of direct current (not shown) connected across these leads.

Figure 12:
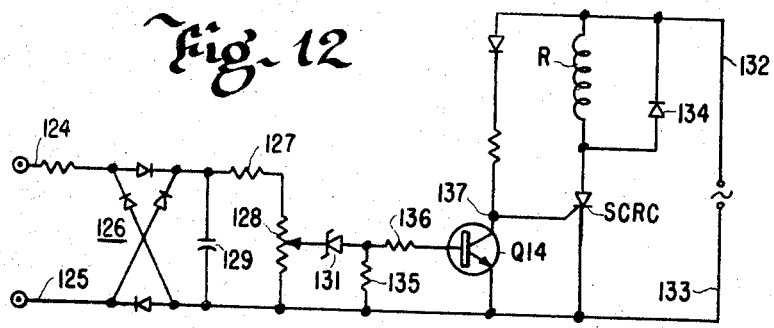
FIG. 12 is a schematic diagram of a monitoring circuit suitable for providing the velocity error signal check, the zero signal check and the leveling signal check for the system of FIG. 2 as functionally represented in FIG. 1.

While the elevator car is stopped, the elevator hoist motor shunt field 24, FIGS. 2 and 14 at line 231, has resistances 121 and 122 in series and is passing minimum current, the pattern signal source 13 is disconnected at main switch contact M and brake relay contact BK-3, the pattern field PF is isolated by open contacts of the up and down generator field relay UF-1, UF-2, DF-1 and DF-2, and the compensating network is discharged to ground through lead 26, potentiometer 17 and back contact BK-6 of the brake relay. A start signal is ineffective at this time unless the direct current output voltage to be applied to the generator field EF is at the prescribed level. A zero check circuit as shown in FIG. 12 monitors this voltage and enables a start signal only if it is below a limiting level. The circuit of FIG. 12 is duplicated for monitoring the output from the amplifier when the elevator is releveling and for continuously monitoring the velocity error signal during a run. In the case of the zero check and leveling check the monitoring circuits corresponding to FIG. 12 are connected to FIG. 2 just ahead of the brake relay contacts between the source and generator field EF at terminals 107 and 109. The velocity error signal check is taken from a high input impedance amplifier 138 at terminals 130 and 130a. This amplifier derives its input as the difference between the speed signal feedback voltage and the input speed pattern voltage obtained from the high side of the gain potentiometer 37 of FIG. 2.

The voltage detector circuit employed for each of these monitoring functions, as shown in FIG. 12 comprises input leads 124 and 125 for connection respectively to the terminals 109 and 107 for zero and leveling monitors and terminals 130 and 130a for the velocity error monitor. A rectifier bridge 126 is provided to insure that input signals of either polarity will result in a positive signal at resistor 127 and the upper end of potentiometer 128. Capacitance 129 avoids the effect of transients. The threshold signal places the 6 volt Zener diode 131 in conduction. Accordingly, the setting of potentiometer 128 establishes the desired threshold for each of the utilizations of this circuit.

An alternating voltage, e.g., 20 volts, is applied to leads 132 and 133. If the Zener diode 131 is subject to less than its threshold voltage, the base of transistor Q14 is at ground and the transistor is shut off. Under these conditions the half wave current through the silicon controlled rectifier SCRC energizes relay coil R since during the positive half cycle of the power supply Q14 collector voltage is high and turns on SCRC. The voltage across the relay coil R pulls in the relay while the diode 134 provides a conductive path for the current of the relay coil during the negative half cycles of the power supply.

When the voltage monitored across leads 124 and 125 is sufficient to raise the cathode voltage of the Zener diode 131 to its threshold for conduction, the voltage developed in resistors 135 and 136 raise the base voltage of transistor Q14 and turns it on. The collector current of Q14 causes sufficient drop at junction 137 to reduce the control electrode of SCRC below its trigger voltage. The absence of conduction in SCRC drops the relay having coil R.

Three relays ZCF, LCF and VCF respectively signifying safe signal levels when energized for the "zero check," the "leveling check" and the "velocity error signal check" have coils (none of which are shown) located in circuits as the coil R in FIG. 12. In the case of relay VCF the circuit of FIG. 12 is fed from a high impedance amplifier 138 as shown at the bottom of FIG. 2.

The error voltage amplifier 138 comprises an input 139 from gain potentiometer 37 to the base of transistor Q15 which is adjusted to a suitable potential by zero adjustment potentiometer 141 connected through resistors 142 and 143 to buses 144 and 145 respectively connected to suitable sources of direct current at negative 18 volts and positive 18 volts. When the brake relay is energized to open back contact BK–6, this circuit is effective. The emitter of Q15 is grounded. A positive error voltage applied to Q15 base reduces the collector voltage since the current in resistor 146 is reduced. This reduces the voltage applied through resistor 147 to the base of transistor Q16 thereby reducing the collector current of Q16 through resistor 148 to raise the voltage applied through resistor 149 to base of transistor Q17. Capacitance 151 between Q16 collector and ground prevents high frequency oscillation to stabilize the amplifier at high frequencies. The increase of voltage at base Q17 increases the collector current of Q17 thereby increasing the voltage drop across resistor 152 and reducing the voltage at terminal 130. A feed back path through lead 153 and resistor 154 stabilizes the amplifier by tending to decrease the effect of the increased error voltage. As in the preceding check circuits an increase in the absolute value of the signal between terminals 130 and 130a applied to the monitor of FIG. 12 causes velocity error check relay VCF having a coil as at R in FIG. 12 to drop.

As will be noted from FIG. 2, relay SCR must be energized to connect the alternating current to controlled rectifiers SCRA and SCRB through contacts SCR–1 and SCR–2. Relay SCR at 206 of FIG. 13 remains energized in normal operation. However, the check circuits are each effective to deenergize that relay or otherwise disable the amplifier feed to error field EF. Under these circumstances the pattern field PF, controlled by the command signal from rheostat 13 provides control for the elevator to bring it to a landing. Note that the deenergization of relay SCR also deenergizes the retard stop approach relay R14 at 238 by opening contact SCR at 238 whereby pattern field PF remains effective even when the elevator approaches a landing for a stop. An indicator "SCR OFF" is actuated by the drop of relay SCR to close its back contact at 210 and if the car was running or leveling during the drop of relay SCR the relay is locked out by failure relay FE at 212 energized at back contact SCR at 212 and start relay contact ST and 212 to open back contact FE at 206 until FE is reset.

With the car stopped, the monitoring circuit for zero signal is effective, and if the threshold level is not exceeded relay ZCF is energized. With the car doors open, as when stopped at a landing, and a start signal imposed, as during a normal starting sequence or during a releveling as might be required by a load change changing the stretch of the supporting cables, leveling signal monitoring is effective and if the signal is excessive relay LCF is deenergized to disconnect the amplifier. A car starting operation is initiated by energizing car starting relay CS (not shown) to close its contacts at 203 in the circuit of want to run relay WTR as shown in FIG. 13 at line 202. Pull in of WTR closes its contact at 214. If no velocity error has been sensed which is of a magnitude to drop relay VCF during the previous run of the elevator, relay SCR is energized through contacts FE and VCF at 206 and ST at 208 until the start signal is effective. With SCR energized, contact SCR at 214 is closed. If the zero check relay is energized, indicating the zero signal below the threshold considered the lower limit of a malfunction, start relay ST is energized at line 214. Back contacts ST at 208 and 209 open while front contacts at 212, 215 and 220 close.

Contacts ST at 208 enters in a leveling function and will be discussed below.

Contacts ST at 209 opens the "off zero" indicator circuit so that the increased voltages applied to the generator field EF which result in the dropping of relay ZCF while the car runs, will have no effect. If during the stop ZCF had dropped at any time, the circuit at 209 would have been completed to actuate "off zero" indicator.

Failure relay FE at 212 locks out the system once it is energized by its seal contact FE at 213 and retains that state through its manually actuated reset switch at 213 until the switch is operated. Relay FE is energized by a coincidence of a start signal, which may be issued either as a conventional starting operation or by a releveling operation, to close contact ST at 212 and the drop of normally energized relay SCR to close back contact SCR at 212. As will be discussed relay SCR can be dropped by an excessive velocity error signal through the opening of contact VCF at 206 or during leveling, when contacts LG at 207 and ST at 208 are open by an excessive leveling signal which opens contact LCF. Thus any leveling signal or velocity error signal exceeding the predetermined limits set for the two monitor circuits of relays LCF and VCF will drop SCR to pull in relay FE thereby locking out relay SCR by opening back contact FE at 206 and actuating the "reset" indicator by closing contact FE at 210. The drop of SCR will close back contact SCR at 210 to actuate the "SCR OFF" indicator, prevent energization of start relay ST by opening contact SCR at 214 and open the supply to SCRA and SCRB in FIG. 2.

Start relay ST can also be prevented from operation by an excessive zero check signal to deenergize relay ZCF and open contact ZCF at 214. In the event the zero check signal is within limits and the ST relay is pulled in, it seals itself at contact ST in line 215. This seal is required since as the signal magnitudes are increased during the normal running of the car contacts ZCF at 214 will open.

The start sequence involves other functions. As indicated above, the hoist motor is arranged to pick up the load rapidly by arranging the system to function with a broad bandwidth in its response to signals during the initiation of starting. This broad bandwidth is achieved by effectively eliminating the pattern field as the motor develops a load sustaining torque. Relay R14 at line 239 of FIG. 14 provides this function while energized. It opens back contact R14 and closes front contact R14 in FIG. 2 so that pattern field PF is bypassed by the pattern signal and the field decays by circulating current in resistor 19. R14 remains energized during the final portion of the door closing interval and incidental thereto the brake is lifted after the car is sufficiently closed to prevent further load exchanges whereby the system senses the unbalanced load prior to any significant motion of the car. When the hatchway and car doors are completely closed, the speed signal then initiates car motion.

The start signal issued by relay CS closes contacts to energize door control relay DT (not shown) and at 216 to energize door close relay CLA in conjunction with closed contacts of door opening control relay OPS (not shown) open while the door is opening, minimum start time relay TR (not shown) open until the door open interval has expired, door open control relay DO (not shown), open upon command for a door opening operation, and door control relay DT all at line 216. CLA seals itself around start signal relay contact CS at 217, energizes the brake relay BK at contact CLA at 220 if the safety switches are all closed and the start relay ST is energized to close its contact at 220 and partially completes circuits for the up and down generator field relays UF and DF and the landing and gate relay LG.

Relay CS also opens the leveling controls for relays UF, DF and BK at back contact CS at 221. The motor field is increased by the start signal through closure of contact CS at 228 to energize motor field normal relay MFN and close it scontact around resistance 121 in series with motor shunt field 24 at line 231. Relay MFN also closes at 221 to afford a partial path for relays UF, DF and BK which will be retained after relay CLA is dropped by the opening of contact DT.

The motor field thus builds up as the car and hatchway doors are driven toward their closed position. Pull in of relay BK causes the energization of main switch M at 218 by the closure of contact BK at 217. Contacts BK–3 and M connect command signal to the reversing circuit by the closure of contacts BK–4 and BK–5 and the opening of BK–1 and BK–2 connects error field EF of the generator to the amplifier. Main switch energizes motor full field relay MFL by closing contact M at 230 to short resistor 122 in the motor field circuit by closed contact MFL at 233.

With both M and BK energized to close their contacts in the brake solenoid circuit at 235 a partial energization of the brake is effected. This is insufficient to lift the brake in view of resistors 161 and 162 and hence the elevator is held by the brake. As the doors advance toward their closed condition and after they are sufficiently closed to prevent further load transfers, door limit switch 163a at 232 is closed. This pulls partial brake relay PBK at 234 to close contact PBK at 235 and complete the brake solenoid circuit to lift the brake.

Upon the energization of the car start relay the path for energizing the generator field relays UF and DF is opened by back contact CS at 221. Landing and gate interlock contacts 164 and 165 which are open until the interlocks make up with the doors fully closed are also open at this time. Coincident with the lifting of the brake the generator field relays are enabled through the leveling circuit so that any movement of the car due to unbalanced load will actuate leveling switches and cause a correcting command signal from rheostat 13 to be applied to the error signal means, potentiometer 17 and lead 26. Contact 163b closes around open car starting contact CS at 222 to enable leveling relay contacts LU and LD to energize generator field relay UF or DF. This circuit can be traced from closed MFN contact at 221, through closed 22 inch leveling relay contact L22 (closed while the car is within 22 inches of level with the landing at which it is stopped), and door limit contact 163b at 222. If the car sags downward contact LD at 222 is closed to complete a circuit for up generator field relay UF through LD and LU at 221. If it sags upward contact LU at 222 is closed to energize DF through LU and LD at 222. Thus a command signal is generated by the leveling relays through the closure of contacts 14 to change the command from rheostat 13 and the generator field relays connect the command at DF–1 and DF–2 or UF–1 and UF–2 to the amplifier. With the pattern connected and the field EF of the generator connected a signal is developed to sustain the load while the system is in its rapid response, broad bandwidth mode of operation.

Once the doors are fully closed and the interlocks made up, landing gate relay LG at 227 is energized through closure of interlock contacts 164 and 165 at 224. These contacts remain closed so long as the doors are fully closed.

While the car is in the leveling zone back contact LDO at 225 of leveling door open relay is open. This contact closes when the car is outside the zone in which the door operation is normally permitted, e.g., eight inches from the landing. It closes to maintain the generator field and brake relays after the car has stopped accelerating. During acceleration contact ACR at 223 provides an energizing path for these relays. The make up of the landing and gate interlocks causes the energization of acceleration relays ACR and ACC to initiate the generation of a speed pattern in rheostat string 13 tending to move the car away from the landing. If the rheostat is not subject to a correcting operation at this time, contact V1 at 224 is closed and the generator field relays are energized from interlocks 164 and 165 through contact V1 at 224, acceleration relay contact ACR at 223 either direction determining relay U or D the overtravel limits 167 or 168, interlocked back contacts DF or UF all at 223 or 226 and relays UF or DF. Also at the time acceleration away from the landing is initiated back contact ACC at 238 is opened to deenergize relay R14 and insert pattern field PF across the command signal, thereby reducing the bandwidth of the system. The car then proceeds to develop speed steps as by the operation of hatchway inductor switches while closely adjacent its starting landing followed by operation of rheostat cams controlling contacts 14 by car motion as described in the aforenoted Bradley-DeLamater patent application, or by the operation of time based acceleration steps followed by operation of said rheostat contacts 14.

The drop of relay R14 closes back contact R14 and opens front contact R14 in FIG. 2 to reconnect the pattern field PF of the generator to the pattern signal and to reduce the bandwidth of the system whereby the accelerating steps of the hatchway inductor switches and the rheostat switch contacts is smoothed as it is combined with the speed signal from the hoist motor to produce a smooth error signal at potentiometer 37.

Door time control relay drops a brief timed interval following the pull in of relay LG to drop relay CLA. At this time alternate circuits are available for those controlled by CLA earlier in the sequence. Brake relay BK is now controlled through the circuits controlling generator field relays UF and DF. The motor field relays and main switch are also controlled by either BK or UF or DF.

If at any time during the run of the elevator an excessive velocity error signal is issued velocity error check relay VCF will drop out opening contact VCF at 206 of FIG. 13.

Failure relay FE responds to a drop of SCR either during a run or a releveling operation since start relay ST is energized at such times to close its contact ST at 212. When FE pulls in, it seals itself at contact FE in line 213 until the manual reset switch is opened at 213.

As the car continues to accelerate on a normal run and as it approaches full speed, a further speed step is achieved by weakening the shunt field of the hoist motor. This is accomplished by opening normally closed contact V12 at 230 to drop motor full field relay MFL and open its contact at 233. Resistor 122 is placed in series with motor shunt field 24 in this manner to reduce its current. Contact V12 can be controlled by the cam device which actuates rheostat switches 14 of FIG. 2 when that device has advanced to the final speed step. Similarly when the command to the car is to reduce speed, the contact closes to strengthen the field by removing resistor 122 from the circuit.

Upon approaching a landing at which the elevator is to be stopped the rheostat 13 is increased in effective resistance by the opening of switches 14 to produce a speed pattern calling for a lower speed. Since the actual speed signal indicated on lead 26 will exceed the lower speed a retarding error signal will be transmitted to compensator 38 from potentiometer 37. Start relay ST of FIG. 13 remains energized until the car is stopped level with the landing as does main switch M, brake relay BK, generator field relays UF and DF, the motor field relays MFN and MFL, partial brake relay PBK and the brake solenoid.

While the car is running and more than a certain distance, e.g., 14 inches, from level with the landing at which it is to stop, the narrower bandwidth system is effective in which the speed pattern steps are smoothed by the presence of pattern field PF in the circuit. The stopping of the elevator involves inserting the resistance of rheostat 13 in the pattern signal source by opening contacts 14. When the controller for contacts 14 has returned to a condition in which it has no speed pattern control, it permits contact V2 at 238 to close. At this time the speed pattern of the elevator is a function of its position as ascertained by inductor switches which are carried past vanes secured in the hatchway to actuate those switches when they are in proximity.

Inductor switch control is provided for a number of contacts shown in FIGS. 13 and 14. Contacts L22 at 221 and L14 at 238 open as the car approaches the landing for a stop and close when the car is within a given distance of its level position, e.g., 22 inches and 14 inches respectively. Landing door zone relay LDO (not shown) is energized by inductor switches when the car is within a zone in which the doors can be opened, e.g., 8 inches from level. A dead zone comprising a range of positions centered around absolute level and ordinarily extending between a half inch and an inch is defined at its upper limit by a leveling up relay LU (not shown) and at its lower limit by a leveling down relay LD (not shown) each responsive to inductor switches so that LU is energized if the car is at or above the level limit and in the leveling zone and LD is energized when it is at or below that limit and in the leveling zone. Either of relays LD or LU deenergize a dead zone relay DZ (not shown) if they are energized.

Advance of the elevator to within the range of proximity of level defined by relay L14 closes back contact L14 at line 238. Since the car is not set to accelerate relay ACC is deenergized and back contact ACC is closed at 238. If the amplifier is controlling the error field EF relay SCR is energized to close contact SCR at 238. Hence during the stopping sequence fourteen inch regulation relay R14 pulls in at 238 and transfers the system to its broad bandwidth operating condition by bypassing pattern field PF in FIG. 2. The controls thereafter respond more rapidly to pattern steps as generated by the operation of the inductor relays and smoothness of the elevator motion is achieved by employing relatively small signal steps. This operation of R14 can also be considered as occurring in response to a given command signal since the closure of contact L14 is also indicative of a command signal step from rheostat 13.

While the elevator is running outside of the leveling zone for the landing at which it is to stop and is not accelerating, the brake relay and the generator field relays are energized through safety switches at 218, start contact ST at 220, motor field normal contact MFN at 221, landing and gate interlocks 164 and 165 and pattern generator corrector contact V1 all at 224, contact LR1 and landing door zone contact LDO to junction 166. An ascending car having relay UF in maintains a circuit from 166 through contact UF at 224, upper overtravel limit switch 167 and back contact DF at 223 and relays UF and BK to lead 159. A descending car has a circuit for DF and BK from junction 166 through contact DF at 225, lower overtravel limit switch 168 and back contact UF at 226.

When the car is advancing in the leveling zone contacts L22 and CS at 221 are closed so that a leveling circuit for relays UF, DF and BK is available when the door zone is entered and back contact LDO at 225 is opened to interrupt the running circuit for those relays.

A car is stopped level when both of relays LU and LD are deenergized and the car is in the dead zone. This is accomplished since relays UF, DF and BK are all dropped to disconnect the generator and motor from the amplifier and set the brake. Front contacts LD at 221 and LU at 222 open to interrupt the circuit for relays UF, DF and BK and front contacts LD at 201 and LU at 202 open with generator field relay contacts UF at 204 and DF at 205 to drop want to run relay WTR and through the opening of contact WTR at 214 start relay ST.

A releveling operation as occasioned by changes in effective cable length due to changes in load, commonly termed "sag," functions through this system by operation of one of the leveling relays LU or LD. An upward sag energizes relay LU to cause releveling downward. A downward sag energizes relay LD to relevel upward.

If LD is energized a circuit is completed to pull in relay WTR at 202 through contacts LD and LU at 201. This completes a circuit for start relay ST at contact WTR at 214. If the zero check is within limits, contacts ZCF at 214 is closed and the closing of contact WTR energizes relay ST. If the leveling check indicates a signal from the amplifier within limits contact LCF at 206 is closed and relay SCR remains energized provided failure contact FE at 206 is not open and the velocity error check is within limits so that contact VCF at 206 is closed. The only circuit available to relay SCR at this stage in the releveling operation is through contact LCF at 206 since the car doors are open to deenergize landing gate relay LG and open contact LG at 207 and the energized start relay opened back contact ST at 208. Thus if an excessive releveling signal is sensed during a releveling operation, relay SCR is dropped to disconnect the supply from the silicon controlled rectifiers.

The sag of the elevator out of the dead zone also energizes the motor field 24 by closing dead zone relay back contact DZ at 229 to energize motor full field relay MFL. Contact MFL at 226 is closed to energize motor normal field relay MFN at 228 while full current is applied to field 24 through contact MFL at 233. Contact MFN at 221 is closed to complete a circuit for the generator field and brake relays, as in the case of a sag downward, through relay UF from lead 158, safety switches at 218, contact ST at 220, contact MFN at 221, leveling contact L22 at 221, back car start contact CS at 221, contact LD at 221, back contact LU at 221, back contact DF at 223, coils UF and BK and lead 159. The motor then drives the car upward with the brake relieved by the energization of leveling brake relay LBK (not shown) to parallel resistor 161 with lesser resistor 169 in the brake solenoid circuit through the closure of contact LBK at 238. Thus upon energization of brake relay BK to close its contacts at 235 and in main switch M circuit at 217 to close contact M at 235 the brake is partially lifted to permit the hoist motor to move the elevator.

A detailed consideration of the parameters of the compensating network 38 and the amplifier 25 will now be undertaken. The present system employs but one outer feedback loop. That single loop is responsive only to velocity of the elevator. It is not concerned with the supplemental factors such as compounding for unbalanced load motor armature current, rate of change of motor armature current, rate of change of velocity, temperature, friction effects, residual magnetism or hysteresis in either the main generator or auxiliary regulator generators, or brush contact resistance. These previously compensated effects are canceled in the present system by the gain around the outer feedback loop since disturbing signals attributable to these effects can be suppressed by gain to result in a ratio of the desired response to the undesired response which is dependent upon the gain of the system between the command input and the disturbance signal input. For example, if one volt of pattern input can produce ten volts of feedback signal with the outer loop of a feedback system open, the speed error due to unbalanced loads will be reduced ten to one when the outer loop is closed. A limit is imposed upon this consideration wherein the feedback signal is shifted in phase since a gain in excess of unity occurring at a time when the phase shaft is 180° results in instability in an elevator system. It is the function of the compensating network to attenuate the gain around the feedback loop comprising the hoist motor, the means developing the speed signal or other performance parameter signal, the signal comparing means in which the error signal is developed, the amplifying means and the compensating means to a value less than unity, when the phase shift reaches 180°. However to be effective the system must have a total D.C. gain around the feedback loop at least equal to the ratio of the unregulated open loop hoist motor speed error or other performance parameter error to the allowable closed loop hoist motor speed error or other performance parameter error. This allowable closed loop hoist motor speed error should not be greater than the smallest speed command to be employed. Thus if a system is arranged for speed steps as low as ½ foot per minute the allowable error should be ½ foot per minute. In the following analysis to develop the parameters for a suitable elevator hoist motor control, use is made of conventional LaPlace Operational Calculus employing the operator "$s$". The operator "$s$" in this method of analysis effects a conversation from the "$t$" (time) domain to the "$s$" domain in accordance with the following relationship:

$$\alpha[f(t)] = sF(s) - f(o)$$

Reference and use is also made of other servo analysis techniques including those known as "Bode Plots."

The general application of the present invention to the control of an elevator hoist motor can be appreciated from a consideration of a direct current, hoist motor, velocity control system equivalent circuit comprising an amplifier having a gain K, to which is applied an input voltage V, and from which an output voltage $V_2$ issues to a loop including a series connected resistance $R_L$ representing the loop resistance, including amplifier output resistance, lead resistance, brush resistance and motor armature resistance, a total loop inductance $L_L$ and a source representing the hoist motor effects. The hoist motor will be assigned a motor constant $K_m$ having units of volts/radian/second, a back E.M.F. $V_b$, a shaft velocity V in radians/sec., a load inertia reflected back to the hoist motor armature J in kilogram meters squared, and an unbalanced torque reflected back to the hoist motor armature of $T_0$ in Newton meters. In this equivalent circuit the loop current is the output voltage less the motor back E.M.F. divided by the impedance:

$$I = \frac{V_2(s) - V_b(s)}{SL_L + R_L} \qquad (1)$$

The hoist motor output torque is:

$$T = K_m I \qquad (2)$$

Substituting (1) in (2):

$$T(s) = K_m \left( \frac{V_2(s) - V_b(s)}{SL_L + R_L} \right) \qquad (3)$$

Motor back E.M.F. can be related to shaft velocity as torque is related to current in (2):

$$V_b(s) = K_m V(s) \qquad (4)$$

Substituting (4) in (3):

$$T(s) = K_m \left( \frac{V_2(s) - K_m v(S)}{SL_L + R_L} \right) \qquad (5)$$

Applying Newton's first law to derive the torque required to move a load at a speed $v$:

$$T(s) = JSv(S) \pm T_0(S) \qquad (6)$$

where the first expression represents the inertia effects of a balanced elevator and the second represents the unbalanced load. The sign on the unbalanced load depends upon whether it is in a direction to aid or oppose the motor torque.

Equating (5) and (6) to provide the relationship of input torque to output:

$$JSv(S) \pm T_0(S) = K_m \left( \frac{V_2(S) - K_m v(S)}{SL_L + R_L} \right) \qquad (7)$$

Solving (7) for velocity v:

$$v(S) = \frac{K_m V_2(S)}{JS(SL_L + R_L) + K_m^2} \pm \frac{T_0(S)(SL_L + R_L)}{JS(SL_L + R_L) + K_m^2} \qquad (8)$$

To obtain the transfer function as the relationship between velocity and the amplifier output voltage for a balanced load:

$$\frac{v(S)}{V_2(S)} = \frac{\frac{K_m V_2(S)}{JS^2 L_L + JSR_L + K_m^2}}{V_2(S)} \qquad (9)$$

Or:

$$\frac{v(S)}{V_2(S)} = \frac{\frac{K_m}{JL_L}}{S^2 + S\frac{R_L}{L_L} + \frac{K_m^2}{JL_L}} \qquad (10)$$

The transfer function for a series resistance, inductance and capacitance when the input voltage is applied across the series connected elements and the output voltage is viewed across the capacitance can be shown to be $$\frac{E_{out}}{E_{in}} = \frac{\frac{1}{LC}}{S^2 + S\frac{R}{L} + \frac{1}{LC}} \qquad (11)$$

By symmetry between the transfer functions of (10) and (11) it will be seen that the similar form signifies an effective capacitance reflected back into the hoist motor armature of the equivalent circuit upon which this discussion has been based.

Thus:

$$1/LC \text{ is similar to } K_m^2/JL_L \qquad (12)$$

Eliminating the inductive elements the relationship (12) approximates:

$$1/C = K_m^2/J \qquad (13)$$

or $$C = J/K_m^2 \qquad (14)$$

Thus the mass driven by the hoist motor can be viewed as coupled into the armature circuit of the hoist motor through the hoist motor.

Next consider the equivalent circuit wherein the amplifier includes a direct current generator having a constant speed drive for its armature, an output voltage at its armature of $E_g$, an input voltage at its shunt field of $E_{in}$, a shunt field inductance $L_f$, a shunt field resistance $R_f$, and a generator constant Kg in volts/ampere.

The output voltage of the assumed generator with a flux $\phi$ is:

$$Vg = Kg\phi \qquad (15)$$

Flux is proportional to field current I hence (15) can be expressed as $$Vg = KgI \qquad (16)$$

The input voltage can be expressed in terms of current to the field:

$$V_{in} = I(SL_f + R_f) \qquad (17)$$

Current to the field can be written:

$$I = \frac{V_{in}/L_f}{S + R_f/L_f} \qquad (18)$$

The transfer function of the generator from (16) and (17) is:

$$\frac{Vg}{V_{in}} = \frac{K_g/L_f}{(s + R_f/L_f)} \qquad (19)$$

By definition of the equivalent circuit including a direct current generator:

$$Vg = V_2 \qquad (20)$$

From (19)

$$V_2 = V_g = V_{in} \frac{Kg/L_f}{S + R_f/L_f} \quad (21)$$

The open loop relationship between velocity and the input voltage to the direct current generator shunt field for an applied step input is obtained by substituting (21) in (10):

$$v(S) = \frac{V_{in} Kg/L_f K_m/JL_L}{(S + R_f/L_f)\left(S^2 + \frac{SR_L}{L} + \frac{K_m^2}{JL_L}\right)} \quad (22)$$

It can be shown that the quantity $(S + R_f/L_f)$ in the denominator of (22) is attributable to the generator shunt field, and further that a break or corner frequency in radians/second for the generator shunt field is:

$$W_{hf} = R_f/L_f \quad (23)$$

The portion of the denominator representing the hoist motor armature circuit, the quadratic in the denominator of (22) can also be shown to have a natural resonant frequency in radians/second:

$$W_{na} = \frac{K_m}{(JL_L)^{1/2}} \quad (24)$$

These values can be employed to ascertain the operating characteristics of a hoist motor system of the type under consideration by means of a graphical analysis plotting on a semilogarithmetic basis the asymptotes of the curve for gain in decibels vs. frequency in radians/second and the phase response on a semilogarithmetic basis of phase shift vs. frequency in radians/second. This form of portrayal enables a composite curve to be constructed representing the attenuation in the system as a series of asymptotes since the corner or break frequency of the elements occurs at the zero gain value and first order equations representing an element are altered at a rate of twenty decibels per decade while quadratic equations representing an element are altered at a rate of forty decibels per decade. Further the products of such elements can be summed graphically.

In elevator hoist motor analysis, experience has shown that a phase margin of 135° affords an acceptably stable system, a system damped to a factor of approximately 0.7. The frequency at which the composite phase shift of the system reaches 135° defines the zero gain level for this degree of stability, hence the composite gain curve can be drawn from this frequency to indicate system characteristics.

This approach has been applied to a 30 k.v.a. generator driving a motor in a system having a motor constant $Kg$ of 43 volts/ampere, a generator shunt field resistance $R_f$ of 12 ohms, a generator field inductance $L_f$ of 6 henrys, a loop inductance $L_L$ of 0.0145 henry, a loop resistance $R_L$ of 0.175 ohm, and a motor constant $K_m$ of 30 Newton-meters/ampere. The elevator car has a capacity of 3000 pounds, an empty car weight of 6100 pounds, and is counterweighted to 40 percent of rated capacity so that for full load operation the inertia $J$ is 922 kilogram-meters²/radian, and the torque is 3051 Newton-meters. The drum over which the hoisting cables are trained has a diameter of 30 inches.

From the above the curves of FIGS. 16 through 19 can be developed. For FIG. 16 generator shunt field asymptote will have a slope of −20 db/decade and a zero gain intercept from Equation 23 of 2 radians/second. The armature circuit will have a slope of −40 db/decade and a zero gain from Equation 24 of 8 radians/second. These asymptotes are shown in FIGS. 16 and 17 and are labeled "field" and "resonant circuit." It will be noted that a "composite" curve can be drawn as the sum of the curves for the elements. This curve can be placed at any level for analysis purposed since if stability requirements are met its level is established by virtue of the amplifier gain imposed on the system at the zero frequency value. Further that level of gain will be maintained until the first break point. Thus the assumed 39 db gain depicted in FIG. 16 is sustained until the field becomes effective to impose attenuation at 2 radians/second. The composite curve then decays at a rate of −20 db/decade until the resonant circuit becomes effective at 8 radians/second after which it decays at a rate of −60 db/decade, the sum of the decay rates.

The phase vs. frequency curve for the field phase shift extends from zero at zero frequency to −90° at infinite frequency and has a 45° phase shift at the break or corner frequency or 2 radians/second. The phase shift attributable to the quadratic element is zero at zero frequency, has −180° shift at infinite frequency, is 90° at the natural resonant frequency or 8 radians/second and has a form dependent upon the damping which is as illustrated. The sum of these curves in FIG. 18 provides the composite.

Where a phase margin of −135° is to be employed the composite gain curve is set at zero at the frequency the composite phase curve is −135°. In FIG. 18 this occurs at 5.6 radians/second. Such a composite stable curve is shown as a dashed line in FIG. 16. Such a setting establishes a D.C. gain of 7.5 decibels. As will be developed below this would be insufficient to suppress the speed error of the system to an optimum level.

Returning to a consideration of the open loop system analyzed above the system can be converted to a closed loop system wherein the velocity of the hoist motor generates a signal which is superimposed upon the command signal to produce a net input signal. This closed loop analysis will permit a derivation of the gain requirement to reduce the open loop speed error to an allowable value. The input to the generator shunt field $V_{in}$ is the difference between the command signal $V_c$ and a signal proportional to motor velocity.

$$V_{in} = V_c - K_B V \quad (25)$$

Equation 21 can be rewritten for the open loop system:

$$V_2 = \frac{V_{in} K_g}{SL_f + R_f} \quad (26)$$

Substituting 26) in (8) and multiplying numerator and denominator by $SL_f + R_f$:

$$v(S) = \frac{K_m K_g V_{in}(S) \pm T_0(S)(SL_L + R_L)(SL_f + R_f)}{[JS(SL_L + R_L) + K_m^2](SL_f + R_f)} \quad (27)$$

Substituting (25) in (27) to obtain the speed error of the closed loop and solving for $v$:

$$v(S) =$$

$$\frac{K_m K_g [V_c(S) - K_B v(S)] \pm T_0(S)(SL_L + R_L)(SL_f + R_f)}{[JS(SL_L + R_L) + K_m^2](SL_f + R_f)} \quad (28)$$

$$v(S) = \frac{K_m K_g V_c(S) \pm T_0(S)(SL_L + R_L)(SL_f + R_f)}{[JS(SL_L + R_L) + K_m^2](SL_f + R_f) + K_B K_m K_g} \quad (29)$$

Applying the final value theorem:

$$\lim_{t \to \text{infinity}} v(t) = \lim_{S \to 0} Sv(S)$$

Assume $T_0$ and $V_c$ are step inputs:

$$T_0(S) = T_0/S$$

$$V_c(S) = V_0/S$$

$$v(t) = \frac{K_m K_g V_c \pm T_0 R_L R_f}{K_m^2 R_f + K_b K_m K_g} \quad (30)$$

Dividing the numerator and denominator of (30) by $K_m^2 R_f$ $$v(t) = \frac{\frac{K_g}{K_m R_f} V_c \pm \frac{T_0 R_L}{K_m^2}}{1 + \frac{K_b K_m K_g}{K_m^2 R_f}} \quad (31)$$

The closed loop zero speed error due to unbalanced load can be obtained by assigning the command signal $V_c$ a value of zero:

$$v(t) = \frac{\pm \frac{T_0 R_L}{K_m^2}}{1 + \frac{K_b K_m K_g}{K_m^2 R_f}} \quad (32)$$

Again considering Equation 27 and applying the final value theorem:

$$\lim_{to \to \text{infinity}} v(t) = \lim_{S \to 0} Sv(S)$$

Assume $V_{in}$ and $T_0$ are step inputs:

$$V_{in}(S) = V_{in}/S$$

$$T_0(S) = T_0/S \, v(t)_{ss} = \frac{K_m K_g V_c}{K_m 2 R_f} \pm \frac{T_0 R_L}{R_m^2} \quad (33)$$

Where the error due to unbalanced load is the second quantity and the system gain from the amplifier input to shaft speed is $$\frac{v}{V_c} = \frac{K_m K_g}{K_m^2 R_f} \quad (34)$$

Since the signal due to motor velocity $V_v$ which is applied to the amplifier input is:

$$V_v = K_b v \quad (35)$$

Equation 35 can be substituted in (34) and a solution for $V_v/V_c$ obtained:

$$V_v/V_c = \frac{K_b K_m K_g}{K_m^2 R_f} \quad (36)$$

This is defined as the loop gain of the system.

The open loop zero speed error can be calculated for the exemplary system can be calculated from Equation 8 as:

$$v_e = \frac{T_0 R_L}{K_m^2} \quad (37)$$

= 0.6 radians/seconds

= 45 feet/minute

If an allowable speed error of ±½ foot/minute is chosen, the closed loop zero speed error from (32) can be calculated for the example:

$$v_e = \frac{\pm \frac{T_0 R_L}{K_m^2}}{1 + \frac{K_b K_m K_g}{K_m^2 R} \pm 1/2} = \frac{45}{1 + \text{loop gain}}$$

loop gain = 89 = 20 log 89 = 39 db

When a steady state loop gain of this magnitude is imposed on the system of FIGS. 16 and 18 the system is unstable. Graphically a gain plot in excess of zero decibels at the phase margin frequency, about 5.6 decibels in the example, is unstable and the composite curve for this level of D.C. gain is illustrated as such.

According to the present invention this D.C. gain of 39 decibels can be retained by the incorporation of attenuating means in the loop which will cause the characteristics of the loop to fall within stable limits. This latter criteria is termed the "phase margin." The requisite attenuation is provided in the present system by a lag-lead network. However a lag-lead network introduces additional negative phase shift into the system. This problem can be eliminated by making the break frequencies of the network low compared to the critical frequencies.

Lag-lead networks tend to lower the bandwidth of the system. An improvement in bandwidth can be achieved by adding a lead-lag network. Lead-lag networks provide positive phase shift which tend to stabilize the system with increased gain and bandwidth.

While a single lag-lead network can be employed, two cascaded lag-lead networks lend themselves to more reasonable component size. In the example one lag-lead network provides 12 decibels of attenuation while the second provides 18 decibels. The lead frequencies of both networks are about at the field break frequency. It is desirable to keep the lead frequency high since closing the loop around the two lag-lead networks forms a quadratic which, if its natural frequency is too low, will degenerate system response.

The two cascaded lag-lead networks and the lead-lag network of compensator 38 of FIG. 2 can be more simply considered as depicted in the equivalent cascaded networks of FIG. 15. These networks comprise the individual lag-lead networks 40 and the lead-lag network 50. In the composite network of FIG. 2 resistors 39 and 41 were both of 22,000 ohms, resistors 43 and 45 were of 3300 ohms and 6800 ohms respectively, capacitors 44 and 45 were of 100 mfd. and 50 mfd. respectively and capacitor 42 was of 1.5 mfd.

This combination of elements produced lag break frequencies for the lag-lead networks of 0.35 radian/second and 0.7 radian/second while their composite lead break frequency was at 2.8 radians/second and the lead break frequency of the lead-lag network is at 5 radians/second. The lag break frequency of the lead-lag network is out of the range of interest at 95 radians/second.

Applying these factors to the asymptote curves of FIG. 17, it will be noted that the two lag-lead networks cause a first break in the composite curve at 0.35 radian/second to a slope of −20 decibels/decade and a second break at 0.7 radian/second to −40 decibels/decade. The generator shunt field becomes effective at 2 radians/second to add another −20 decibels/decade to the attenuation. Slightly above this frequency, at 2.8 radians/second, the lead component of the lag-lead networks has a break frequency to decrease the composite slope to −20 decibels/decade. A further decrease to zero slope between 5 radians/second and the critical frequency of the quadratic or armature loop at 8.2 radians/second is provided by the lead of the lead-lag network. The composite gain curve has been drawn for a D.C. gain of 39 decibels. It will be noted that its zero gain frequency is 9 radians/second somewhat above the critical frequency of 5 radians/second derived from the composite phase curve. This indicates that the system will be damped by somewhat less than the factor 0.7 since gain and damping are inversely proportional. However a slight adjustment of the D.C. gain downward by about 1.5 decibels will bring the gain margin within the limits set.

The phase vs. frequency curves of FIG. 19 are derived in the manner of those of FIG. 18. The field and armature circuit curves are as shown in FIG. 18. The negative phase shifts due to the lag-lead and lead-lag curves each attain −45° at their break frequencies and have a total −90° shift. The positive phase shifts due to the lead-lag and lag-lead curves also attain +45° at the other break frequency for the networks and cause a total shift of +90°. When added the curves offer a composite as shown which reaches −135° at 5 radians/second to define the phase margin.

The phase and gain characteristics of an open-loop hoist motor system predicts the stability of that system with the loop closed. Thus a system with the compensating networks and gain illustrated for FIGS. 17 and 19 will be stable although slightly underdamped as indicated by the plot of the system gain vs. frequency shown in FIG. 20. As noted the system has a slight tendency to increase gain near the upper limit of its range. This tendency is damped sufficiently so that multiple oscillations are avoided even with signal changes of this frequency and as indicated by the attenuation, at higher frequencies the signals are attenuated without permitting the system to enter oscillation.

From the above discussion and the curves of FIGS. 16 through 19 a number of criteria can be established for the loop gain and the compensating network attenuation and phase characteristics for an elevator hoist motor system having stable characteristics and an acceptable speed of response. The gain at D.C. is set by the ratio of the allowable speed error to the unregulated speed error. Also the gain is a measure of the attenuation of the system from D.C. to the critical frequency defined by the phase margin. That is the frequency at which the phase shift reaches its acceptable limit for a system damped to the degree desired. In the example this damping factor was 0.7 and the phase margin was −135°. The parameters of the hoist motor armature circuit define a significant gain and phase component, and when a D.C. generator supplies the hoist motor the generator shunt field characteristic is also significant. Usually the field characteristic has a break frequency below that of the armature circuit. However this is not universally so.

Effective compensation is achieved by providing adequate gain at the low frequencies to reduce the unregulated speed error while attenuating that gain at the critical frequency of the loop. Thus lag-lead compensation should become effective below that element of the system having the lower frequency gain curve, the generator field in the example. This tends to reduce the gain of the composite curve, the loop, as it approaches the critical frequency.

Extension of the critical frequency can be achieved by the use of lead lag compensation provided it is introduced at the proper frequency. The curves of FIGS. 17 and 19 show it to be advantageous to place the break frequency for the lead-lag near the critical frequency of the quadratic expression, the hoist motor armature circuit. Further advantage is obtained if it just precedes that critical frequency, in the usual system employing a D.C. generator having a shunt field, between the field and the quadrature critical frequencies.

The lag-lead networks can also be arranged to have their second break frequency fall between the field and the quadrature frequencies with advantageous results, while the second break frequency of the lead-lag network should be beyond the range of interest to avoid detrimental effects on the over all loop characteristic in the operating range of the system.

The critical frequencies of lag-lead networks can be calculated from the network 40 of FIG. 15 or its counterparts employing series inductance by considering the voltage across the input $E_{in}$ in terms of current I, the resistance $R_1$ of the series resistor and $R_2$ of the shunt resistor, and the capacitance C:

$$E_{in} = I\left(R_1 + R_2 + \frac{1}{CS}\right) \tag{38}$$

The output voltage $E_0$ in terms of current is:

$$E_0 = \frac{E_{in}\left(R_2 + \frac{1}{CS}\right)}{\left(R_1 + R_2 + \frac{1}{CS}\right)} \tag{39}$$

$$E_0 = \frac{E_{in}R_2\left(S + \frac{1}{R_2C}\right)}{R_1 + R_2\left(S + \frac{1}{R_1+R_2}C\right)} \tag{40}$$

From (40) it can be shown that the break frequency at which lag is introduced from the zero gain level $f_{bd}$ is:

$$f_{bd} = \frac{1}{(R_1+R_2)C} \tag{41}$$

Also from (40) the break frequency at which lag is terminated $f_{bu}$ is at:

$$f_{bu} = \frac{1}{R_2C} \tag{42}$$

Similarly a lead-lag network as shown at 50 in FIG. 15 or its inductive counterpart can be established with critical frequencies from a consideration of the voltage input $E_{in}$, the current I, the series resistor $R_a$, the shunt resistor $R_b$, the series capacitance C and the voltage output $E_0$ as follows:

$$E_{in} = IR_b + \frac{1/C}{\left(S + \frac{1}{R_aC}\right)} \tag{43}$$

$$E_{in} = IR_b \frac{S + \frac{1}{R_aC} + \frac{1}{R_bC}}{S + \frac{1}{R_aC}} \tag{44}$$

$$E_0 = E_{in} \frac{S + \frac{1}{R_aC}}{S + \frac{R_a+R_b}{R_aR_bC}} \tag{45}$$

From (45) the break up frequency for the lead-lag network is defined by:

$$f_{bu} = \frac{1}{R_aC} \tag{46}$$

The breakdown frequency $f_{bd}$ and the end of its effect with increasing frequency is obtained from (40) as:

$$f_{bd} = \frac{R_a+R_b}{R_aR_bC} \tag{47}$$

While the above system is set forth in but one embodiment the teaching is intended to be interpreted in general terms applicable to an elevator hoist motor and the circuit parameters associated therewith since these compensation and gain parameters can be defined in terms of the hoist motor loading and characteristics. Further the concepts involved here are not restricted to the form of compensating means or amplifying means disclosed since many corresponding devices are available. As noted by lag-lead and lead-lag networks having inductive elements instead of capacitative elements are known and could be employed. Further the buffer amplifier-controlled rectifier-D.C. generator amplifier combination might be altered without departing from the spirit or intended scope of this invention. One such departure is to utilize no D.C. generator and supply the motor armature directly from a high power amplifier such as a combination of controlled rectifiers connected to a polyphase supply or magnetic amplifiers. Accordingly, the above disclosure is to be read as illustrative of the invention and not in a limiting sense.

It should be noted that certain subject matter disclosed in this application is embodied in copending United States patent applications including application Ser. No. 758,776, filed Sept. 10, 1968 in the names of Donivan L. Hall and Richard C. Loshbough for "Safeties For Elevator Hoist Motor Control Having High Gain Negative Feedback Loop," and application Ser. No. 767,276, filed Oct. 14, 1968, in the name of Richard C. Loshbough for "Electrical Circuit for Pulse Fed Inductive Load."

Having described the invention, we claim:

1. A hoist motor system for an elevator which includes a car driving means for the car, and a counterweight, comprising, in combination, a direct current hoist motor; an armature for said hoist motor; a shunt field for said hoist motor; means to energize said shunt field; a direct current generator; an armature for said generator; a shunt field for said generator; a series connection of said motor armature and said generator armature; means for developing a speed command signal representing the desired speed of said motor armature; means for developing a speed signal proportional to hoist motor speed; means for comparing said speed and command signals to develop an error signal representative of the difference between the commanded motor speed of said command signal and the actual motor speed; and means for forcing said speed error signal to a negligibly small value; said forcing means comprising a frequency sensitive compensating means external of said motor and said generator and an amplifying means external of said motor and said generator to amplify and apply said error signal to said generator shunt field; said compensating means, said amplifier, said hoist motor, and said signal comparing means and said means for developing a signal proportional to hoist motor speed comprising a closed negative feedback loop having a total direct current gain around said feedback loop at least equal to the ratio of the unregulated open loop hoist motor speed error to the allowable closed loop hoist motor speed error; said compensating means attenuating the closed loop gain as a function of increasing frequency sufficient to reduce said closed loop gain to a value less than unity at and above the natural resonant frequency of the resonant circuit comprising the total inductance and resistance in the hoist motor armature circuit and the capacitative effect of the total driven mass, including said car, said driving means for said car and said counterweight, coupled into said armature circuit through said hoist motor whereby the imperfect regulatory characteristics of said motor, said generator, and said interconnecting circuit are suppressed to a negligible value; said compensating means comprising a resistive-capacitive lag lead network which attenuates said effective error signal as a function of frequency and has a lead break frequency in the range of 2.5 to 5 radians per second.

2. A hoist motor system for an elevator which includes a car driving means for the car, and a counterweight, comprising, in combination, a direct current hoist motor; an armature for said hoist motor; a shunt field for said hoist motor; means to energize said shunt field; a direct current generator; an armature for said generator; a shunt field for said generator; a series connection of said motor armature and said generator armature; means for developing a speed command signal representing the desired speed of said motor armature; means for developing a speed signal proportional to hoist motor speed; means for comparing said speed and command signals to develop an error signal representative of the difference between the commanded motor speed of said command signal and the actual motor speed; and means for forcing said speed error signal to a negligibly small value; said forcing means comprising a frequency sensitive compensating means external of said motor and said generator and an amplifying means external of said motor and said generator to amplify and apply said error signal to said generator shunt field; said compensating means, said amplifier, said hoist motor, and said signal comparing means and said means for developing a signal proportional to hoist motor speed comprising a closed negative feedback loop having a total direct current gain around said feedback loop at least equal to the ratio of the unregulated open loop hoist motor speed error to the allowable closed loop hoist motor speed error; said compensating means attenuating the closed loop gain as a function of increasing frequency sufficient to reduce said closed loop gain to a value less than unity at and above the natural resonant frequency of the resonant circuit comprising the total inductance and resistance in the hoist motor armature circuit and the capacitative effect of the total driven mass, including said car, said driving means for said car and said counterweight, coupled into said armature circuit through said hoist motor whereby the imperfect regulatory characteristics of said motor, said generator, and said interconnecting circuit are suppressed to a negligible value; said compensating means comprising a pair of cascaded lag lead networks connected between said means developing said error signal and said amplifying means.

3. A hoist motor system for an elevator car serving a plurality of stops which includes driving means for the car, and a counterweight, comprising, in combination, a direct current hoist motor; an armature for said hoist motor; a shunt field for said hoist motor; means to energize said shunt field; a direct current generator; an armature for said generator; a shunt field for said generator having two sections; a series connection of said motor armature and said generator armature; means for developing a speed command signal representing the desired speed of said motor; means for developing a speed signal proportional to hoist motor speed; a first section of said generator shunt field being connected to pass current controlled by said command signal generating means; means for comparing said speed and command signals to develop an error signal representative of the difference between the commanded motor speed of said command signal and the actual motor speed; a second section of said generator shunt field being connected to pass current as controlled by said error signal from said signal comparing means; means for forcing said speed error signal to a negligibly small value; said forcing means comprising a frequency sensitive compensating means external of said motor and said generator and an amplifying means external of said motor and said generator to amplify and apply said error signal to said generator shunt field; said compensating means, said amplifier, said hoist motor, and said signal comparing means and said means for developing a signal proportional to hoist motor speed comprising a closed negative feedback loop having a total direct current gain around said feedback loop at least equal to the ratio of the unregulated open loop hoist motor speed error to the allowable closed loop hoist motor speed error; said compensating means attenuating the closed loop gain as a function of increasing frequency sufficient to reduce said closed loop gain to a value less than unity at and above the natural resonant frequency of the resonant circuit comprising the total inductance and resistance in the hoist motor armature circuit and the capacitive effect of the total driven mass including said car, said driving means for said car and said counterweight, coupled into said armature circuit through said hoist motor whereby the imperfect regulatory characteristics of said motor, said generator, and said interconnecting circuit are suppressed to a negligible value; and switching means for effectively separating said first portion of said generator shunt field from said command signal generating means in response to a predetermined condition in said system.

4. A combination in accordance with claim 3 wherein said switching means is actuated to remove said first portion of said generator shunt field from the control of said command signal means as said elevator car reaches a predetermined position in its approach to a stop.

References Cited

UNITED STATES PATENTS

| | | | |
|---|---|---|---|
| 2,448,564 | 9/1948 | Wilkerson. | |
| 2,470,099 | 5/1949 | Hall. | |
| 2,620,898 | 12/1952 | Lund | 187—29 |
| 2,643,741 | 6/1953 | Esselman | 187—29 |
| 3,240,290 | 3/1966 | Pohlman | 187—29 |
| 3,297,110 | 1/1967 | Bagnasco | 187—29 |

ORIS L. RADER, *Primary Examiner.*

T. E. LYNCH, *Assistant Examiner.*

U.S. Cl. X.R.

318—18, 307